(12) United States Patent
Birch

(10) Patent No.: US 12,498,148 B2
(45) Date of Patent: Dec. 16, 2025

(54) SYSTEMS AND METHODS FOR HEAT ENERGY MANAGEMENT

(71) Applicant: THERMOVERSE LLC, Detroit, MI (US)

(72) Inventor: Shantonio Winston Saint Birch, Canton, MI (US)

(73) Assignee: Thermo Verse, LLC, Detroit, MI (US)

( * ) Notice: Subject to any disclaimer, the term of this patent is extended or adjusted under 35 U.S.C. 154(b) by 0 days.

(21) Appl. No.: 18/837,451

(22) PCT Filed: Feb. 10, 2023

(86) PCT No.: PCT/US2023/062414
§ 371 (c)(1),
(2) Date: Aug. 9, 2024

(87) PCT Pub. No.: WO2023/154883
PCT Pub. Date: Aug. 17, 2023

(65) Prior Publication Data
US 2025/0109895 A1  Apr. 3, 2025

Related U.S. Application Data

(60) Provisional application No. 63/478,301, filed on Jan. 3, 2023, provisional application No. 63/309,459, filed on Feb. 11, 2022.

(51) Int. Cl.
*F25B 21/02* (2006.01)

(52) U.S. Cl.
CPC ...... *F25B 21/02* (2013.01); *F25B 2321/0252* (2013.01)

(58) Field of Classification Search
CPC ............... F24F 5/0042; F28D 20/028; F28D 2021/0029; F28F 13/003
See application file for complete search history.

(56) References Cited

U.S. PATENT DOCUMENTS

| 5,385,020 A | 1/1995 | Gwilliam et al. |
| 7,147,071 B2 * | 12/2006 | Gering ............... B60H 1/08 165/41 |

(Continued)

OTHER PUBLICATIONS

Cao et al. article titled "Thermal energy storage with turnable melting point phase change materials," Proceedings of the 16th International Heat Transfer Conference, IHTC-16, Aug. 10-15, 2018, Beijing, China, IHTC16-22260.

(Continued)

*Primary Examiner* — Filip Zec
(74) *Attorney, Agent, or Firm* — Aurora Consulting LLC; Albert Du; Ashley Sloat

(57) ABSTRACT

Described herein are devices, systems, and methods for the capturing, transferring, and managing of heat energy. Phase change materials are used for their high thermal inertia property and large energy per volume property when operated near their solid-liquid transition point. Additionally, the systems, devices, and methods utilize one or more thermoelectric modules thermally coupled to a first side of the phase change material and one or more thermoelectric modules thermally coupled to a second side of the phase change material, opposite the first side. The use of the thermoelectric modules allows heat energy to be stored in, transferred within, or harvested from, the phase change material the thermoelectric modules couple to.

20 Claims, 11 Drawing Sheets

(56) References Cited

U.S. PATENT DOCUMENTS

| | | | | |
|---|---|---|---|---|
| 8,324,699 | B2* | 12/2012 | Ichijo | H01L 27/13 |
| | | | | 438/149 |
| 9,105,809 | B2* | 8/2015 | Lofy | H10N 10/13 |
| 9,293,680 | B2* | 3/2016 | Poliquin | H01M 14/00 |
| 9,306,143 | B2* | 4/2016 | Ranalli | F01N 13/087 |
| 9,310,112 | B2* | 4/2016 | Bell | B60H 1/00271 |
| 9,373,770 | B2* | 6/2016 | Chakraborty | H10N 10/17 |
| 9,555,686 | B2* | 1/2017 | Ranalli | B60H 1/034 |
| 9,845,998 | B2* | 12/2017 | Kreuger | F01K 3/12 |
| 10,003,004 | B2* | 6/2018 | Boukai | H10N 10/17 |
| 10,290,796 | B2* | 5/2019 | Boukai | G04G 19/10 |
| 10,465,587 | B2* | 11/2019 | Krüger | F01N 1/026 |
| 10,480,409 | B2* | 11/2019 | Teixeira | F01D 25/10 |
| 10,488,085 | B2* | 11/2019 | Peter | F01K 27/00 |
| 10,603,976 | B2* | 3/2020 | Androulakis | B60N 2/56 |
| 10,784,546 | B2* | 9/2020 | Piggott | H05K 3/325 |
| 10,991,869 | B2* | 4/2021 | Jovovic | H10N 10/81 |
| 11,053,847 | B2* | 7/2021 | Apte | F28D 20/0056 |
| 11,152,557 | B2* | 10/2021 | Jovovic | H05K 1/0201 |
| 11,162,387 | B1* | 11/2021 | McCormick | F25B 27/005 |
| 2012/0174956 | A1 | 7/2012 | Smythe et al. | |
| 2013/0087180 | A1* | 4/2013 | Stark | H10N 10/13 |
| | | | | 136/205 |
| 2013/0186445 | A1* | 7/2013 | Lorimer | H10N 10/17 |
| | | | | 136/224 |
| 2013/0265767 | A1 | 10/2013 | Lang | |
| 2014/0008033 | A1* | 1/2014 | Howes | F28D 20/0056 |
| | | | | 165/10 |
| 2014/0060051 | A1* | 3/2014 | Ohler | F01K 25/06 |
| | | | | 60/659 |
| 2014/0230455 | A1 | 8/2014 | Chandler et al. | |
| 2014/0326287 | A1* | 11/2014 | Wiant | H10N 10/13 |
| | | | | 136/205 |
| 2017/0309545 | A1 | 10/2017 | Hiller | |
| 2019/0290400 | A1 | 9/2019 | Stone-Collonge et al. | |
| 2020/0373638 | A1 | 11/2020 | Lee | |

OTHER PUBLICATIONS

Hagenkamp Markus et al article titled "Thermoelectric building temperature control: a potential assessment," International Journal of Energy and Environmental Engineering (2022) 13:241-254, https://doi.org/10.1007/s40095-021-00424-x, Received: Apr. 12, 2021 / Accepted: Aug. 28, 2021 / Published online: Sep. 3, 2021, © The Author(s) 2021.

Hirschey et al. article titled "Review of Low-Cost Organic and Inorganic Phase Change Materials with Phase Change Temperature between 0 C and 65 C," 6th International High Performance Buildings Conference at Purdue, May 24-28, 2021, https://docs.lib.purdue.edu/ihpbc.

Huang, Sen et al. article titled "Transactive Control Design for Commercial Buildings to Provide Demand Response," 2019, IFAC (International Federation of Automatic Control) Hosting by Elsevier Ltd. All rights reserved, IFAC PapersOnLine 51-34 (2019) 151-156.

International Search Report and Written Opinion re PCT/US23/62414 dated Jun. 2, 2023 (11 pages).

Kishore et al. article titled "Enhancing building energy performance by effectively using phase change material and dynamic insulation in walls," ScienceDirect, Applied Energy, vol. 283, Feb. 1, 2021, 116306, https://doi.org/10.1016/j.apenergy.2020.116306.

Kishore et al. article titled "Evaluating cascaded and tunable phase change materials for enhanced thermal energy storage utilization and effectiveness in building envelopes," ScienceDirect, Energy and Buildings, vol. 260, Apr. 1, 2022, 111937, https://doi.org/10.1016/j.enbuild.2022.111937.

Kommandur et al. article titled "Dual Phase Change Thermal Diodes with High Rectification for Thermal Management near Room Temperature," Wiley Online Library, Advanced Materials Technologies, vol. 7, issue 5, May 2022, 2101060, first published Oct. 28, 2021, https://doi.org/10.1002/admt.202101060.

Kosny Jan et al. article titled "Cost Analysis of Simple Phase Change Material-Enhanced Building Envelopes in Southern U.S. Climates," U.S. Department of Energy, Energy Efficiency & Renewable Energy, Building Technologies Program, Jan. 2013.

Lau et al. article titled "Dynamic tunability of phase-change material transition temperatures using ions for thermal energy storage," from Cell Reports Physical Science, vol. 2, Issue 10, Oct. 20, 2021, 100613, https://doi.org/10.1016/j.xcrp.2021.100613.

Melton et al. article titled "Transactive Control: An Approach for Widespread Coordination of Responsive Smart Grid Assets," Pacific Northwest Smart Grid Demonstration Project, Battelle, Pacific Northwest Division dated May 18, 2010.

Prasher et al. article titled "Solid State Tunable Thermal Energy Storage and Switches for Smart Building Envelopes," U.S. Department of Energy, Office of Energy Efficiency & Renewable Energy.

International Preliminary Report on Patentability re PCT/US2023/062414 date of issuance Aug. 6, 2024 (8 pages).

* cited by examiner

SYSTEMS AND METHODS FOR HEAT ENERGY MANAGEMENT

CROSS-REFERENCE TO RELATED APPLICATIONS

This application is a 35 U.S.C. 371 National Stage Application of PCT/US2023/62414, filed Feb. 10, 2023; which claims the priority benefit of U.S. Provisional Patent Application Ser. No. 63/309,459, filed Feb. 11, 2022; and U.S. Provisional Patent Application Ser. No. 63/478,301, filed Jan. 3, 2023, the contents of each of which are herein incorporated by reference in their entireties.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of managing heat energy, and more specifically to the field of heating and air conditioning and the thermal management of enclosures of varying volume. Described herein are systems and methods for managing heat energy and modulating temperatures.

BACKGROUND

Heating and cooling of enclosures and objects has been practiced for a very long time. Many of the basic principles and challenges remain today, including, efficiency constraints, non-uniform temperature profiles, and other inherent issues. The inefficiency of heating and cooling, for example, in buildings, is largely to do with static insulation of the building envelope. Static insulation, which is traditionally used in most heating and cooling applications, only slows the transfer of heat energy through the building envelope. Whether it is the ingress of heat energy coming into the envelope (e.g., during the summer) or the loss of heat energy (e.g., during the winter), static insulation largely functions to slow these processes down. Additionally, static insulation does not function to capture, convert, or transfer any portion of the heat energy passing through the building envelope.

Traditional heating, ventilation, and air conditioning (HVAC) systems have efficiency shortcomings that are hard to economically address, including the loss of heat energy during winter months, wasting energy during summer months due to the ingression of heat energy, non-uniform temperature profile, the lack of independent temperature control within enclosures, diurnal losses, and other inherent drawbacks of the enclosure envelope. Heating, ventilation, and air conditioning systems account for a large amount of greenhouse gas emissions annually, and inefficient systems contribute unwarranted emissions. Accordingly, there exists a need to develop new devices and systems that address these long-known issues while maintaining or improving affordability, comfort, performance, space utilization, and case-of-retrofit.

SUMMARY

In some aspects, the techniques described herein relate to a system for managing heat energy, the system including: a thermal energy storage medium having a first surface opposite a second surface, a first thermocouple positioned on the first surface of the thermal energy storage medium; a first thermal interface material between the first thermocouple and the first surface of the thermal energy storage medium; a second thermocouple positioned on the second surface of the thermal energy storage medium; and a second thermal interface material between the second thermocouple and the second surface of the thermal energy storage medium.

In some aspects, the techniques described herein relate to a system for managing heat energy, the system including: a thermal energy storage medium having a first surface opposite a second surface; a front-end array including a first plurality of thermoelectric modules, wherein the front-end array is positioned on the first surface of the thermal energy storage medium; and a back-end array including a second plurality of thermoelectric modules, wherein the back-end array is positioned on the second surface of the thermal energy storage medium.

In some aspects, the techniques described herein relate to a method of managing heat energy, the method including: coupling a front-end array on a first surface of a thermal energy storage medium, wherein the front-end array includes one or more first thermoelectric modules; coupling a back-end array on a second surface of the thermal energy storage medium, wherein the first surface is opposite the second surface, and wherein the back-end array includes one or more second thermoelectric modules; and modulating a temperature of at least a portion of the thermal energy storage medium using the front-end array, or the back-end array, or both.

In some aspects, the techniques described herein relate to a computer-implemented method of controlling a temperature within an enclosure, the method including: receiving a first air temperature input, at a processor, from a first one or more locations in the enclosure; receiving a first wall temperature input, at the processor, from the first one or more locations in the enclosure; receiving a first setpoint air temperature input, at the processor, for the first one or more locations in the enclosure; and when a first air temperature corresponding to the first air temperature input differs from the first setpoint air temperature input, outputting a first control signal to one or both of: a first system to modulate the first air temperature within the first one or more locations of the enclosure, or a second system to modulate a first wall temperature of at least a portion of an interior wall of the first one or more locations of the enclosure to modulate the first air temperature, wherein the second system includes a first plurality of thermoelectric modules coupled to a first surface of a thermal energy storage medium and a second plurality of thermoelectric modules coupled to a second surface of the thermal energy storage medium, and wherein the second surface of the thermal energy storage medium is opposite the first surface of the thermal energy storage medium, the first surface defining an interior surface and the second surface defining an exterior surface.

In some aspects, the techniques described herein relate to a system of controlling an air temperature within an enclosure, the system including: a first system configured to modulate the air temperature within one or more compartments; a second system configured to modulate the temperature of at least a portion of an interior wall of the enclosure; and a processor communicatively coupled to the first and second systems, wherein the first system includes a first plurality of thermoelectric modules coupled to a first surface of a thermal energy storage medium and the second system includes a second plurality of thermoelectric modules coupled to a second surface of the thermal energy storage medium, the first surface, defining an interior surface, being opposite the second surface, defining an exterior surface.

In some aspects, the techniques described herein relate to a computer-implemented method of controlling a temperature within an enclosure, the method including: receiving, at a processor, a predefined parameter for the enclosure, wherein the predefined parameter is determined from sensor data or a model of the enclosure or a similar enclosure; receiving, at the processor, a predefined setpoint temperature input for the enclosure; receiving a central air temperature input, at the processor, for the enclosure; determining whether the central air temperature input is within a tolerance range of the predefined setpoint temperature input; when the central air temperature input within a specific region is outside of the tolerance range of the predefined setpoint temperature input for that region, modulating an air temperature of the enclosure using a temperature modulating system, wherein a degree of modulation is based on the predefined parameter for the enclosure.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

Figure 1:
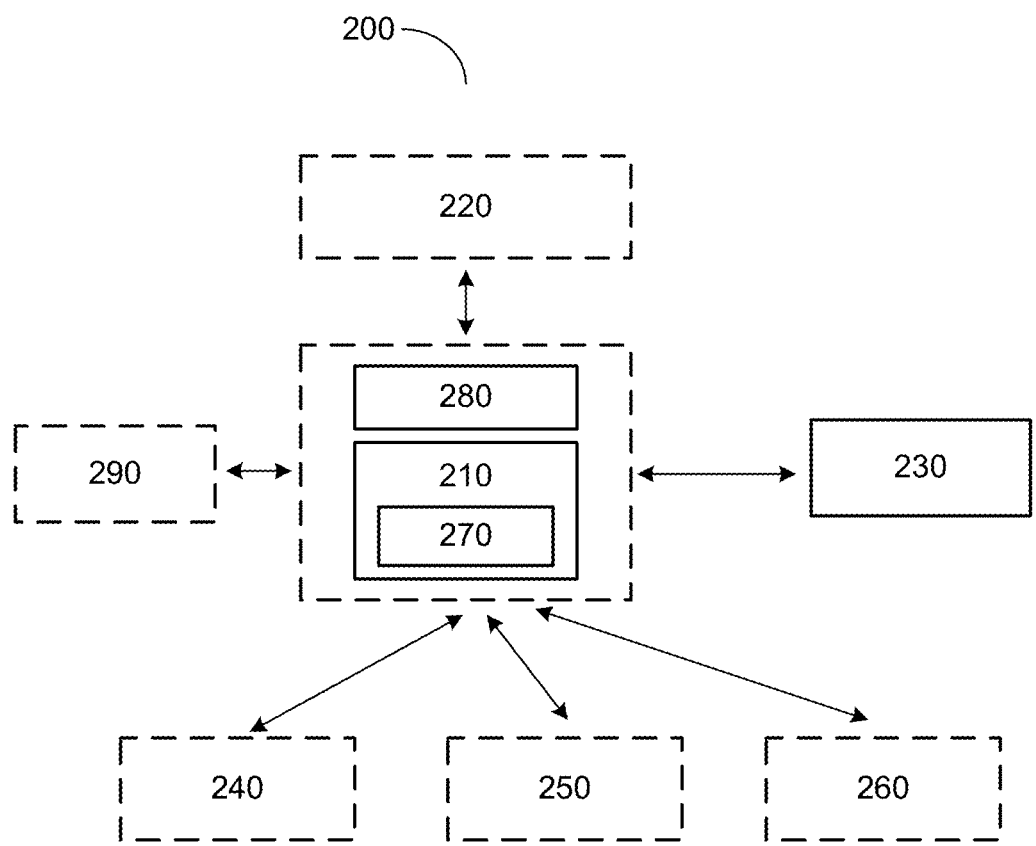
FIG. 1 is a schematic of an embodiment of a system for heat energy management.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

Prior or conventional systems have attempted to address both energy efficiency and thermal management concerns associated with thermal or heat management within enclosures. However, these prior or conventional systems suffer from several drawbacks or technical problems.

For example, heat management systems for semi-infinite enclosures (e.g., building enclosures) have relied on the use of Peltier modules combined with solar photovoltaics to create Active Building Envelopes (ABE) or wall facades. However, these systems are limiting, because static thermal insulation is required for them to operate efficiently similar to conventional HVAC systems. Furthermore, conventional heat sinks (typically finned) and an air gap channel are typically needed to dissipate the heat. Other heat management systems for semi-infinite enclosures (e.g., buildings) combine Peltier modules to create air conditioners having heat storage capabilities enabled by thermal energy storage or phase change materials (PCM). However, these systems are standalone units that occupy living space and also require static thermal insulation to operate efficiently. Lastly, recent attempts have been made to address both energy efficiency and dynamic insulation of the enclosure envelope using thermal energy storage materials and non-thermoelectric devices (broadly categorized as dynamic insulation material and system (DIMS)). However, the specific method used to actuate heat transfer through the PCM material relies on the use of a thermal switch (a mechanical device with moving parts) and/or a thermal diode (a passive device that cannot be actuated on demand).

The various embodiments described herein solve the technical problems of the prior systems by providing several technical solutions/capabilities. The technical solutions/capabilities provided by the embodiments described herein include (i) smart (intelligent) load control via optional sensor-based temperature, humidity, and atmospheric control, (ii) zone and microzone temperature control via the thermoelectric modules (e.g., Peltier modules), (iii) dynamic thermal insulation & storage, (iv) waste heat recovery, and (v) envelope diagnostics and monitoring via spatial mapping of the thermal envelope. Not all capabilities are necessarily enabled in the various or each of the embodiments described herein. These capabilities are achieved without occupying living space and, in many cases, without the need for air gap channels to dissipate heat. Furthermore, unlike the PCM-integrated DIMS described above, the embodiments described herein are principally enabled by thermoelectric modules (e.g., Peltier modules) which are non-mechanical (i.e., maintenance-free), active (i.e., electrically-actuated), and capable of actuating heat transfer to and from the PCM material, while providing primary, supplemental, or augmented heating and/or cooling.

As shown in FIG. 1, described herein are systems 200 for managing heat energy in an enclosure. The systems described herein include one or more processors 280 communicatively coupled to a memory 210 having an application 270 stored thereon. The processor 280 may be read information from and write information to memory 210 to effect any of the methods described elsewhere herein. Processor 280 is communicatively coupled to a thermal energy management module, array, system, or thermoelectric module 230. The processor 280 may be optionally communicatively coupled to a remote computing device 220 (e.g., a server) for additional computing capacity and/or power and/or for a distributed network of connected systems.

Optionally, some embodiments include uses with traditional heating, ventilation, and air conditioning systems 260. Traditional heating, ventilation, and air conditioning systems 260 may include, radiant heating systems, electric heat pumps, a fan, and/or radiant cooling systems. Traditional heating, ventilation, and air conditioning systems may be referred to as HVAC systems. Further, as described elsewhere herein, system 200 may optionally include electrical or wireless communication with an external circuit 250. Each of these components will be described in greater detail below.

The definition for an enclosure is as follows. Any closed system comprising of a volume confined by physical boundaries (e.g., walls, membrane, etc.), and may include systems in which such volumetric confinement is achieved by a one or more physical boundaries (e.g., a surface) and an environment (e.g., the atmosphere). For example, an open or closed building could be an enclosure. Also, the surface of a road and the environment above it could be an enclosure associated with the influx and back irradiation of heat into and out of the earth's atmosphere.

The term "manage," or any form of the term may be used herein. For example, "manage," when used with regards to heat energy, may be used interchangeably with, or any form of, monitor, actuate, modulate, manage, or store. Additionally, the terms, or any form of the terms, monitor, actuate, modulate, manage, or store may be used interchangeably with each other as well.

The term "harvest" or any form of the word may be used herein. For example, "harvest," when used with regards to heat energy, may define the conversion of heat energy into electrical energy by one or more thermoelectric modules based on the temperature differential across the modules.

The term "electrical energy" may be interchangeable with current, voltage, or electrical power.

The term "communicatively coupled" may be defined as either wireless communication (i.e., wirelessly coupled) between components or a wired connection between components.

Figure 6:
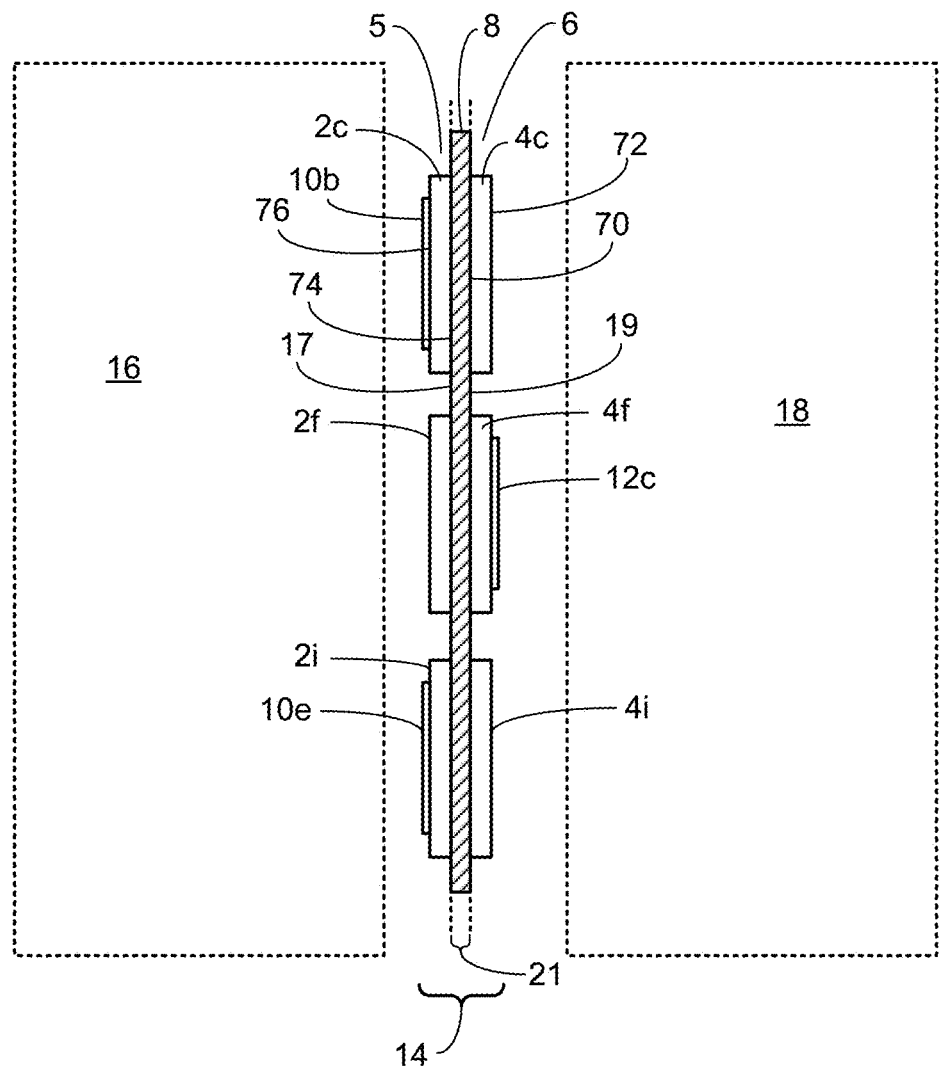
FIG. 6 illustrates an embodiment of a thermal energy storage medium between two pluralities of thermoelectric modules, dividing an internal volume or enclosure and an environment.

Some following embodiments may include one or more thermoelectric modules coupled to the phase change material, and sometimes referred to as "thermally coupled" to the phase change material. It is inferred herein that the coupling or the thermal coupling of a thermoelectric module to the phase change material or any type of thermal energy storage medium may be done with direct contact of the thermoelectric module to the phase change material, or indirectly with the use of thermal interface materials or a small air gap between the thermoelectric module and the phase change material. Thermal interface materials may include materials with high thermal conductivity, such as, thermally conductive alloys, thermal greases, thermal epoxies, elastomers, or any other materials known in the art for increasing heat energy transfer. Thermal interface materials may come in a sheet form, or a paste form, and it is contemplated that the thermal interface material may be positioned between the thermoelectric module and the phase change material. For example, as shown in FIG. 6, thermal interface material may be positioned between thermoelectric modules 2c, 2f, 2i and the phase change material 8. Additionally, thermal interface material may be positioned between thermoelectric modules 4c, 4f, 4i and the phase change material 8.

Phase change materials described herein may be referred to as "PCMs". Phase change materials are defined herein as materials which absorb and release heat energy when they change phase. Further, phase change materials may absorb heat energy during their solid-to-liquid transition and may release heat energy during their liquid-to-solid transition. Phase change materials described in embodiments may be used due to the large amount of heat energy that can be stored during their solid-to-liquid transition and for the large amount of heat energy that can be released during their liquid-to-solid transition. For some desired effects, phase change materials with solid-solid transitions may be selected. For example, some embodiments may include phase change material with morphological properties, such as, solid-solid transition between two different crystalline forms (i.e., polymorphs). Embodiments that include polymorphic phase change material may operate at temperatures near or at their solid-solid transition temperature, thus obviating the need for a matrix to encapsulate the phase change material in the liquid form. Phase change materials have high thermal inertia properties when operated near their liquid-solid transition temperature (liquid-solid transition as used herein may be interchangeable with solid-solid transition). Embodiments herein may include encapsulated phase change material, micro-encapsulated phase change material, neat phase change material, and composite phase change material. Further, the phase change material may be encapsulated within an encapsulation material having properties ranging from thermally insulative to thermally conductive as to restrict or facilitate, respectively, heat flow through the plane and/or in the plane of the phase change material. Additionally, relative to other phase change materials, some phase change materials may have larger temperature ranges at which their phase change occurs. Some embodiments may include phase change materials with large transition temperature ranges. The composition of the phase change material may be engineered to include a solid-liquid transition temperature appropriate for the embodied application. For example, engineered waxes can be produced or tuned with desired solid-liquid transition temperatures. Tuning of solid-liquid transition temperatures may be done with the use of ions, and their effect on concentration gradient due to their migration. Phase change materials may be paraffin wax, non-paraffin organics, hydrated salts, fatty acids, and metallics. Embodiments described herein operated proximal to human comfort temperature levels or human comfort temperature specifications may have a plurality of phase transition temperatures to match various climate zones (e.g., eight climate zones within the U.S., climate zones worldwide, etc.), human thermal comfort specifications, or specification for the operation of man-made equipment. It has been contemplated that embodiments may include phase change material ranging in flexibility. Contemplated phase change materials may be rigid, flexible, elastic, or have any other mechanical properties suitable for their application.

A list of phase change materials that may be used include, but are not limited to, $LiClO_3$, $K_2HPO_4 \cdot 6H_2O$, $KF \cdot 4H_2O$, $Na_2CrO_4 \cdot 10H_2O$, $Cu(NO_3)_2 \cdot 6H_2O$, $FeNH_4(SO_4)_2 \cdot 12H_2O$, $Mn(NO_3)_2 \cdot 6H_2O$, $LiNO_3 \cdot 3H_2O$, $CaBr_2 \cdot 6H_2O$, $Zn(NO_3)_2 \cdot 6H_2O$, $Na_2HPO_4 \cdot 12H_2O$, $FeCl_3 \cdot 6H_2O$, $Na_2CO_3 \cdot 10H_2O$, $CaCl_2 \cdot 6H_2O$, $Na_2SO_4 \cdot 10H_2O$, $Ca(NO_3)_2 \cdot 4H_2O$, $Fe(NO_3)_3 \cdot 9H_2O$, $Na_2S_2O_3 \cdot 5H_2O$, $Na_3PO_4 \cdot 7H_2O$, $Cd(NO_3)_2 \cdot 4H_2O$, $Cr(NO_3)_3 \cdot 9H_2O$, $Mg(CH_3CO_2)_2 \cdot 4H_2O$, $MnCl_2 \cdot 4H_2O$, $Co(NO_3)_2 \cdot 6H_2O$, $Al(NO_3)_3 \cdot 9H_2O$, $CH_3COONa \cdot 3H_2O$, $Na_4P_2O_7 \cdot 10H_2O$, Na2B4O7.10H2O, BalOH12.8H2O, Na3PO4.12H2O, NAOH·H2O, NaHSO4·H2O, or any other phase change material alternative known in the art.

Although in some applications phase change material may be a preferable thermal energy storage medium due to the high energy storage capability when near their transition temperature, any material in which it is possible to store heat energy and remove heat energy may be used as the thermal energy storage medium. Phase change material is used herein with embodiments, but it has been contemplated that phase change material could be interchangeable with any material in which heat energy can be stored or removed from. It is further contemplated that embodiments may use PCM materials that are actuated in other ways (e.g., non-thermally or optically) for long-term thermal energy storage and release.

Thermoelectric modules 230 are described throughout this disclosure and shown in FIG. 1. Thermoelectric modules 230, as described herein, may include Peltier modules, solid state electric heat pumps, solid state electric engines, thermoelectric generators, solid state refrigerators, heat flux sensors, modules that benefit from the Peltier effect, modules that benefit from the Seebeck effect, modules that benefit from the thermoelectric effect, or modules that benefit from the Thomson effect. Some embodiments utilize thermoelectric modules with through-plane thermoelectric generation, with in-plane thermoelectric generation, or a combination of both. Further, thermoelectric modules 230 may be as simple as a single thermocouple. Another example of a thermoelectric module 230 may include a plurality of thermocouples wired in series but are positioned thermally in parallel. Embodiments with thermoelectric modules including one or more thermocouples may include thermocouples constructed from polymers, inorganic perovskites, composites, homogenous materials, heterogenous materials, amorphous, crystalline semiconductors, or any other appropriate thermocouple material known in the art. Some embodiments include thermoelectric modules 230 with a first side being opposite a second side, in which a first side is heated, and the second side is cooled when an electrical current polarity in a first orientation is applied. If an opposing electrical current is applied, the first side is cooled while the second side is heated. In the embodiments described herein, the thermoelectric modules 230 are thermally coupled to a thermal energy storage medium by either the first side or second side of the thermoelectric module. Some embodiments utilize thermoelectric modules 230 in film or thin film form. Film or thin film thermoelectric modules may be used, for example, when coupling to phase change material in sheet form. Additionally, thermoelectric modules of embodiments described herein may range in flexibility. Contemplated thermoelectric modules may be rigid, flexible, elastic, or have any other mechanical properties suitable for their application. For example, flexible and/or elastic thermoelectric modules may be coupled with flexible and/or elastic phase change material, for resulting embodiments with flexible and/or clastic capabilities.

Thermoelectric modules 230, with the capability of generating electrical energy from heat energy (i.e., performing as a thermoelectric generator) and producing heat energy from electrical energy, provide considerable advantages when thermally coupled to phase change material. Phase change material near or at its transition temperature can store considerable amounts of heat energy with respect to volume. The heat energy may be transferred into the phase change material by one or more thermoelectric modules thermally coupled to the phase change material. Heat energy transferred into, or absorbed by, phase change materials may also occur through radiation, convection, conduction, or a combination of the aforementioned heat transfer types. The phase change material may also store heat energy absorbed radiantly from sunlight, absorbed convectively from air (either inside an enclosure or from the surrounding environment), absorbed convectively from gas streams (e.g., exhaust from internal combustion engines), and other heat sources. Additionally, a considerable amount of heat energy may be harvested from a phase change material near or at its transition temperature, and the heat energy may be harvested by one or more thermoelectric modules thermally coupled to the phase change material. Heat energy may also be harvested from the phase change material beyond the phase transition temperature, although in some instances it may be less efficient as harvesting energy near or at the phase change material transition temperature. A further capability of embodiments employing two or more thermoelectric module is transferring heat energy from one portion of the phase change material to another portion. For example, a first thermoelectric module may harvest heat energy from the phase change material proximal to where the first thermoelectric module is thermally coupled into electrical energy, and this electrical energy may be transferred to a second thermoelectric module thermally coupled to another portion of the phase change material. When the second thermoelectric module receives the electrical energy, the electrical energy is converted to heat energy which could either be absorbed by the phase change material proximal to where the second thermoelectric module is thermally coupled or repurposed to augment space heating or cooling. In another example, a first thermoelectric module may pump or move heat energy from the phase change material proximal to where the first thermoelectric module is thermally coupled to another portion of the phase change material that has yet to reach its thermal energy storage capacity.

Embodiments described herein may further include non-thermoelectric modules used in conjunction with thermoelectric modules to further facilitate harvesting heat energy from the phase change material or the environment. For example, thermophotovoltaic cells or modules may be used to harvest energy radiantly. Thermophotovoltaic modules may receive heat energy transferred from the phase change material in the form of radiation. Radiant heat energy may be converted to electrical energy by the thermophotovoltaic modules and be transferred and/or stored, as described herein for electrical energy generated by thermoelectric modules. Other examples of non-thermoelectric modules may include thermal diodes, thermal switches, and etc.

Embodiments described herein may further include non-thermoelectric modules used in conjunction with thermoelectric modules to facilitate harvesting of non-thermal (e.g., optical) and thermal (e.g., heat) energies from the phase change material or the environment. For example, solar photovoltaic cells or modules may be used to harvest solar radiation and thermoelectric modules may be used to harvest heat energy. Solar photovoltaic modules may receive solar energy transferred from the environment in the form of radiation. Radiant solar energy may be converted to electrical energy by the solar photovoltaic modules and be transferred and/or stored, as described herein for electrical energy generated by thermoelectric modules.

Some embodiments may utilize phase change material in the form of a sheet. As shown in FIG. 6, the thickness 21 of suitable phase change material 8 sheets is dependent on the application and may vary considerably between applications. Some embodiments include, for example, phase change material 8 used within a building enclosure, a thickness 21 within a range of about 0.00001 cm to about 100 cm; about 0.0001 cm to about 50 cm; about 0.1 cm to about 10 cm; etc. Shown in FIG. 4, the sheet of phase change material 8 may include a first face 9 having a first surface area, and a second face 11 having a second surface area, the first face 9 being on an opposite side of the second face 11. The first surface area and/or the second surface area may be greater than an adjacent surface area of the sheet of phase change material, for example an edge or perimeter of the phase change material. The first surface area and second surface area may be substantially equal. Some embodiments include a first set of one or more thermoelectric modules thermally coupled to the first face and a second set of one or more thermoelectric modules coupled to the second face. Embodiments including a plurality of thermoelectric modules in the first set of thermoelectric modules and a plurality of thermoelectric modules in the second set of thermoelectric modules may include envelope thermal management capabilities. For example, these embodiments may be used to shift heat energy in the sheet of phase change material. Further, in some instances, heat energy may exist, or be absorbed, at higher levels in particular portions of the phase change material 8, and, as such, heat energy may exist, or be absorbed, at lower levels in other portions of the phase change material 8. In these instances, embodiments may actuate a first set of one or more thermoelectric modules from the front-end array 5 and the back-end array 6 that are proximal to the one or more phase change material 8 portions with higher heat energy. Actuating the first set of one or more thermoelectric modules may cause heat energy to be harvested from the portions of phase change material with higher heat energy. Additionally, the embodiments may actuate a second set of one or more thermoelectric modules proximal to the one or more phase change material portions with lower heat energy. Actuating the second set of one or more thermoelectric modules may cause heat energy to transfer into the portions of phase change material with less heat energy. Envelope thermal management described herein may also be referred to as, or with regard to, dynamic insulation. Embodiments described herein may include transparent phase change material and/or transparent thermoelectric modules. Embodiments with at least a portion constructed of transparent phase change material and/or transparent thermoelectric modules may be suitable for window or sight-glass applications.

Referring to FIG. 6, the combined width 14 of the phase change material 8, the thermoelectric modules and, in some embodiments, temperature sensors on the thermoelectric modules may be about 0.3 cm to about 5 cm; about 1 cm to about 4 cm; about 1.5 cm to about 3 cm; etc. Some embodiments include the capability of transferring heat energy to different portions of the phase change material as described herein, and also include the capability of heat energy being harvested from or stored in the phase change material from one or both of the first face and the second face. Managing heat energy from the first face and the second face may greatly increase the efficiency of managing the heat energy in the phase change material. If a portion of the phase change material has one or more first thermoelectric modules on a first face opposite a second face with one or more second thermoelectric modules, the rate of transferring heat energy to and from the phase change material portion could be considerably larger than transferring heat energy to and from the phase change material portion from only one side. The one or more thermoelectric modules placed on the first side of the phase change material (e.g., sometimes referred to as a front-end array) and the one or more thermoelectric modules on the second side of the phase change material (e.g., sometimes referred to as a back-end array) may both be controlled independently of one another, or in coordination with each other.

Some embodiments include a sheet of phase change material forming one or more walls of an enclosure or portions of walls of an enclosure. From a cross-sectional perspective of the enclosure wall, embodiments may be used to form any layer of the enclosure wall, for example, the interior most layer, exterior most layer, or any layer between the aforementioned layers. Further, a layer may include a coating applied to a wall. The enclosure may confine air with an average temperature (partly regulated by HVAC systems in some embodiments) different than the environmental temperature at least partially surrounding the enclosure. For at least the time scale over which the phase transition occurs, the high thermal inertia of the phase change material optimizes the temperature differential across the thermoelectric modules on the interior of the enclosure and optimizes the temperature differential across thermoelectric modules on the exterior of the enclosure. For example, if the enclosure is a building with heating, the phase transition temperature of the phase change material may be less than the temperature of the air in the interior of the building but may be greater than the temperature of the air of the external environment. As such, and with interior referring to the inside of the enclosure and with exterior referring to the outside of the enclosure, the thermoelectric modules thermally coupled to the phase change material on the interior side of the phase change material and the thermoelectric modules thermally coupled to the phase change material on the exterior side of the phase change material, are exposed to a temperature differential across them. Electrical energy generation by thermoelectric modules require a temperature differential, thus, the described example may be used to optimize heat energy harvesting from both sides of the phase change material. Additionally, the heat stored within the phase change material and the heat pumped from the thermoelectric modules may be used to offset energy demands due to central HVAC systems, while optimizing thermal comfort. Although exemplified as a building with heating, the inverse is true as well with cooling. The temperature of the phase change material may be greater than the temperature of the air in the interior of the building but may be less than the temperature of the air of the external environment. As such, the thermoelectric modules thermally coupled to the phase change material on the interior of the building and the thermoelectric modules thermally coupled to the phase change material on the exterior of the building are exposed to a temperature differential across them. Some embodiments may be used to manage heat energy within any enclosure in which heat energy management is useful. Examples may include, but are not limited to, a canister containing a material with sub-ambient temperature (e.g., dry ice), an electrochemical battery, or air ducts and pipes.

Expanding further on enclosures with air temperature control and with at least a portion of one or more walls equipped or constructed with phase change material and accompanying thermoelectric modules, the balance of thermal inertia may be extremely useful. Embodiments with the heat energy transferring and managing capabilities described herein may include the capability of dynamic insulation. Dynamic insulation is the process of shifting or modulating thermal inertia of the enclosure envelope to alter the rate at which its temperature equilibrates with the environment. In terms of a thermal envelope of an enclosure, heat energy may be shifted from warmer spots to cooler spots, and by doing so, substantially moderates the temperature of the interior of the enclosure. In embodiments with multiple enclosures (e.g., rooms within a building, compartments within a refrigerated truck, compartments within rails, compartments within ships, compartments within airplanes, or rooms within commercial and residential buildings), heat energy can be transferred to or from portions of phase change material to moderate the temperature of the thermal envelope. Additionally, heat energy can be transferred to and from phase change material portions within individual compartments or independent air comfort temperature control for the purposes of thermal management of individual compartments or localized air temperature control. Some embodiments may include the capability of autonomously actuating heat energy transfer from portions of the phase change material, in which the solid-liquid transition temperature has been reached, to avoid full transition of the phase change material (e.g., transitioning fully into a liquid). The harvested energy (i.e., the heat energy converted to electrical energy) from these portions of the phase change material may be transferred to another portion of the phase change material, or be converted into electrical energy and stored within an electrical energy storage device.

During winter months, traditional HVAC systems are known to suffer from heat energy loss issues. Said another way, traditional HVAC lose a considerable amount of heat energy through the walls of the enclosure in which the HVAC is heating the interior air to human comfort levels, defined herein as waste heat energy. During summer months, traditional HVAC systems actively remove heat energy from the interior air when cooling interior air to human comfort levels, and the frequency at which the HVAC system is active is largely based off the rate at which heat energy transfers from the environment (convectively or radiantly transferred on to the exterior of the enclosure) surrounding the enclosure, through the walls, and convectively into the interior air. Thus, the amount of energy consumed by the HVAC system is dependent, at least in part, upon the rate at which heat energy enters the enclosure. Other factors that influence the energy consumed by the HVAC system may include the level of ventilation, the volume of the enclosure, the thermal insulation, humidity conditions, diurnal and seasonal solar heat loads, etc. Enclosures may exploit embodiments described herein to reduce heat energy loss, for example, during winter months, and to reduce energy use by the HVAC system 260, for example, during summer months. One or more walls of the enclosure may include portions constructed of phase change material in sheet form.

With respect to an enclosure, the sheet of phase change material may include a plurality of thermoelectric modules 230 thermally coupled to an interior 17 (shown in FIG. 6) surface of the phase change material and a plurality of thermoelectric modules 230 thermally coupled to an exterior 19 (shown in FIG. 6) surface of the phase change material. For example, during winter months with the HVAC system 260 heating the interior air, at least a portion of the heat energy which is traditionally lost through the walls of the enclosure may instead be harvested, transferred, or repurposed. The phase change material, having some heat energy storage capability relative to the temperature of the application requiring thermal management, will absorb the heat energy that would typically be lost. In some embodiments, triggered by a temperature threshold of the phase change material, the phase change material can transfer the heat energy either to another portion of the phase change material or harvest it and transfer it to an external circuit 250, for example, an electrical energy battery bank or the electrical grid. Heat energy may also be transferred directly to or from a thermal battery bank. Further exemplified, during the summer months with the HVAC system 260 consuming energy while removing heat energy from the interior air, at least a portion of the heat energy, which traditionally transfers from the environment through the enclosure walls and ultimately into the interior air, may instead be harvested by the thermoelectric modules of the front-end array and/or back end-array, and may be transferred to an external circuit 250. Changes in temperature and temperature differentials are conducive for moisture accumulation. As such, embodiments described herein may utilize a moisture mitigation or barrier layer on one or both sides 17, 19 and including encompassing the one or more thermoelectric modules (shown in FIG. 6). Covering the thermoelectric modules and phase change material with a moisture mitigation or barrier layer may avoid contact of moisture to the thermoelectric modules and/or the phase change material. Embodiments described herein may further include force convection systems (e.g., a fan or jet impingement device) to move air flow over one or both sides 17, 19 (shown in FIG. 6). Moving air flow over a side of the phase change material may reduce moisture buildup. It may also enhance convective heat transfer by the volume 16 air at the interior side 17, or by environment 18 air at the exterior side 19 (shown in FIG. 6).

Although many examples of embodiments are described herein with respect to enclosures, it has been contemplated that embodiments may be used with a vehicle enclosure, an aircraft enclosure, a watercraft enclosure, a spacecraft enclosure, or any other small, medium, large or semi-infinite enclosures in which precise or adequate thermal management of the enclosure (e.g., cabin temperatures) is desired for the purposes of maintaining thermal comfort, storing thermal energy, or harvesting thermal energy. When used in buildings, vehicles, aircraft, watercraft, spacecraft, or any other applications with enclosure with occupants, the embodiments may dampen pressure shock waves from external inputs (e.g., jerk, snap, crackle, pop). Further benefits to applications with enclosures with occupants, may be thermal shock absorption of, for example, explosions. Embodiments may absorb at least a portion of the thermal shock that would otherwise effect occupants. Some embodiments may be well-suited for electrical vehicles or hybrid vehicles. Any of the embodiments described herein may provide primary, supplemental, or augmented heating and/or cooling to semi-infinite enclosures such as those described herein, as well as other enclosure systems ranging from small-sized enclosures (e.g., calorimeter compartments for fruitflies, space thermal suits for animals and humans, etc.) to medium-sized enclosures (e.g., cabin of automotives, helicopters, yachts, etc.) to large-sized enclosures (e.g., refrigerated trucks, rails, passenger aircrafts, etc.) to semi-infinitely-sized enclosures (e.g., cold chains, indoor farming, manufactured houses, etc.). Some contemplated embodiments may include specialty packaging, for example pharmaceutical packaging, where it may be desirable to maintain an enclosure (e.g., a pharmaceutical delivery package) in a predefined temperature range relative to an external environment. Further, contemplated embodiments include augmented reality uses. For example, during the use of augmented reality technology, embodiments of the present invention may be used to produce thermal effects upon a user, for example for an additional "dimension" during use. Biomedical uses of some embodiments have also been contemplated, for example, heating and/or cooling wraps, and thermoregulation body suits As described herein, some embodiments may operate in conjunction with traditional HVAC systems 260, but it has been further contemplated that some embodiments may operate in conjunction with other devices and systems in place of traditional HVAC systems. For example, various embodiments described herein may operate in conjunction with the thermoregulation of the body, cooling packs inside of enclosures, heating packs inside of enclosures, home appliances, exhaust streams carrying heat energy, etc.

Some embodiments described herein may be communicatively coupled to an external circuit 250, such as, an electrical battery bank, an electrical grid, a solar array, one or more wind turbines, one or more generators, or any combination thereof (otherwise known as direct current distributed resources). The external circuit 250, in some variations, can act as an energy reservoir. Some embodiments may be coupled to external thermal energy reservoirs (e.g., thermal battery banks) in such a way, as to be capable of transferring heat energy to or from the one or more external energy reservoirs.

An electrical grid is defined herein as an interconnected network for electrical delivery to and from consumers. The external circuits may be communicatively coupled to the thermoelectric modules of the embodiments described herein. Embodiments communicatively coupled to electrical storage devices, for example, an electrical battery bank, an electrical grid, or any other electrical energy storage devices, may transfer electrical energy harvested by the thermoelectric modules to electrical storage devices, or may receive electrical energy at the thermoelectric modules from the electrical storage devices. It is contemplated that any embodiments communicatively coupled to external circuits include any required hardware for proper electrical communication. For example, required hardware may include, inverters, amplifiers, or any other electrical hardware used to change the properties of electricity. Further, embodiments used with buildings may be communicatively coupled to the building's electrical system (i.e., serving as an electrical distribution or storage device). For example, embodiments described herein may be wired to the building's main panel or sub-panel, and may include a circuit breaker in the circuitry. The introduction of the circuit breaker may add a layer of protection against unforeseen electrical energy overloading in embodiments. Additionally, embodiments described herein may be plugged into electrical outlets or wired into fixture boxes, both of which may include circuit breakers in their circuitry.

As shown and described elsewhere herein, one or more sensors 240, for example one or more temperature sensors, may be used in the various systems and methods. Temperature sensors are defined herein as temperature sensors with one or more temperature measuring devices within them. As such, some temperature sensors described herein have the capability of measuring two temperatures simultaneously. Appropriate temperature sensors may include thermocouples, resistance temperature detectors, semiconductor based integrated circuits, or any other temperature sensor known in the art. Further, some embodiments described herein may be capable of measuring temperature with thermoelectric modules 230. As such, and where appropriate, temperature sensing described as being performed by temperature sensors may be performed by thermoelectric modules 230. Additionally, embodiments may include one or more sensors 240, such as humidity sensors, pressure sensors, or any other climatic sensors for the measurement of climatic conditions.

As shown in FIG. 1, controls for some embodiments described herein may include one or more processors (e.g., local processor 280 or remote processor in a remote computing device 220), or one or more analog thermostats (not shown), or both. Processors and thermostats may receive the measured temperatures (e.g., from sensors 240) and, based on predefined setpoint temperatures, output one or more control signals, which cause one or more system components (e.g., heating and cooling system, also called herein as thermoelectric module 230, HVAC system 260, etc.) to effect a change to an air temperature, wall temperature, or enclosure temperature based on the control signal.

Additionally, various computer-implemented applications 270 stored in memory 210 (e.g., using one or more local processors 280 or remote processors in a remote computing device 220) may control various aspects of some of the embodiments described herein using methods that incorporate the Internet-of-Things (IoT). Additionally, processors may be Multiple-Input Multiple-Output (MIMO) processors. MIMO processors receive inputs (e.g., temperature measurements from temperature sensors) and, based on the inputs, output control signals respectively. MIMO processors may be used with estimator protocols (e.g., a Kalman filter), as such, the amount of temperature sensors used may be decreased. MIMO processors used with estimator protocols, estimate (e.g., interpolate) temperatures in areas without temperature sensors based off the received measurements from existing temperature sensors. Other processor types may include data-driven calibration processors, also known as agents (e.g., reinforced learning or machine learning). Data-driven calibration processors take inputs continuously (i.e., from online) and adapt the system as it operates. Data-driven calibration processors differ from non-data-driven calibration processors (i.e., MIMO processors) that receive inputs that are known, set, or predefined calibration setpoints. It should be inferred that embodiments described herein as receiving temperature measurements from temperature sensor may instead forecast temperatures with data-driven calibration protocols. For example, the controls for some embodiments described herein may further include one or more sensors 240 communicatively coupled to one or more processors 280. The sensor signals received by the one or more processors 280 can cause the one or more processors 280 to output a control signal based on the sensor signal. For example, motion sensors, proximity sensors, infrared sensors, or the like may be used to indicate the presence of a person within an enclosure. As such, autonomous adjustments (output by the one or more processors) to predefined temperature setpoints may be made. For example, if a person is not present in an enclosure, the setpoint air temperature may be lowered to reduce energy usage. In addition, motion sensors or other proximity sensors may be used to indicate in what portion or portions of the enclosure one or more persons may be present. By identifying in-use portions of the enclosure, various embodiments may be used to adjust the temperature comfort levels of those portions. For example, if a person is not present in a portion of the enclosure, less heat energy can be allocated to that portion of the enclosure for maintenance of comfort temperature levels, or heat energy may be transferred from that portion. One or more processors may control electrical energy to and from thermoelectric modules (e.g., individually or wired in subsets) by the use of electrical control devices. For example, the one or more processors may use relays, solid-state or mechanical, to control the flow of electrical energy produced by a thermoelectric module harvesting heat energy from a portion of a phase change material. Further, the one or more processors may use relays, solid-state or mechanical, to control the flow of electrical energy consumed by a thermoelectric module transferring heat energy into a portion of a phase change material. The one or more processors may control an array of relays, solid-state or mechanical, combining a multitude of circuits to accomplish the electrical energy transfer of some embodiments. Further exemplified, thermoelectric modules wired as subset may be connected to another thermoelectric subset on another portion of a phase change material by the activation of a solid-state relay, thus actuating a transfer of heat energy between the portions of phase change material. Some embodiments may connect a single thermoelectric module to another single thermoelectric module on another portion of a phase change material by activation of a solid-state relay, thus actuating a transfer of heat energy between the portions of phase change material. In addition, the one or more processors may actuate relays to connect individual or subsets of thermoelectric modules to an external circuit, and, depending on the orientation, accomplish transfer of electrical energy to or from the one or more thermoelectric modules. Some embodiments may use pulse width modulation controls and protocols in place of, or conjunction with, relays or switches. Use of pulse width modulation controls and protocols may control the voltage levels of electrical energy transfer. Controlling the voltage levels of electrical energy to thermoelectric modules may affect the heat transfer rate of the thermoelectric module into the phase change material or the temperature of the air surrounding the modules.

Furthermore, traditional HVAC systems 260 are typically accompanied with noise, for example, the rumble of a furnace or the sound of a fan. As such, users of HVAC systems associate these noises with imminent temperature change. In some embodiments, mimicking noise or sound or imitation noise or sound may be produced by one or more speakers 290 (communicatively coupled to one or more processors 280) based on by control outputs from the one or more processors 280 and received by the one or more speakers 290. The mimicked noises may inform a person in the enclosure that temperature adjustment or maintenance is being done.

Systems and Devices

The systems and devices described herein function to manage heat energy. In some embodiments, the systems and devices function to adjust and/or maintain internal temperatures within an enclosure. The systems and devices are used for the managing of heat energy in enclosures, but can additionally or alternatively be used for any suitable applications, clinical, logistical, military, nautical, aerospace, aviation, or otherwise. The systems and devices may be configured and/or adapted to function for any suitable device or system that is designed for or would benefit from modulating temperature, harvesting heat energy, and/or managing heat energy.

Figure 4:
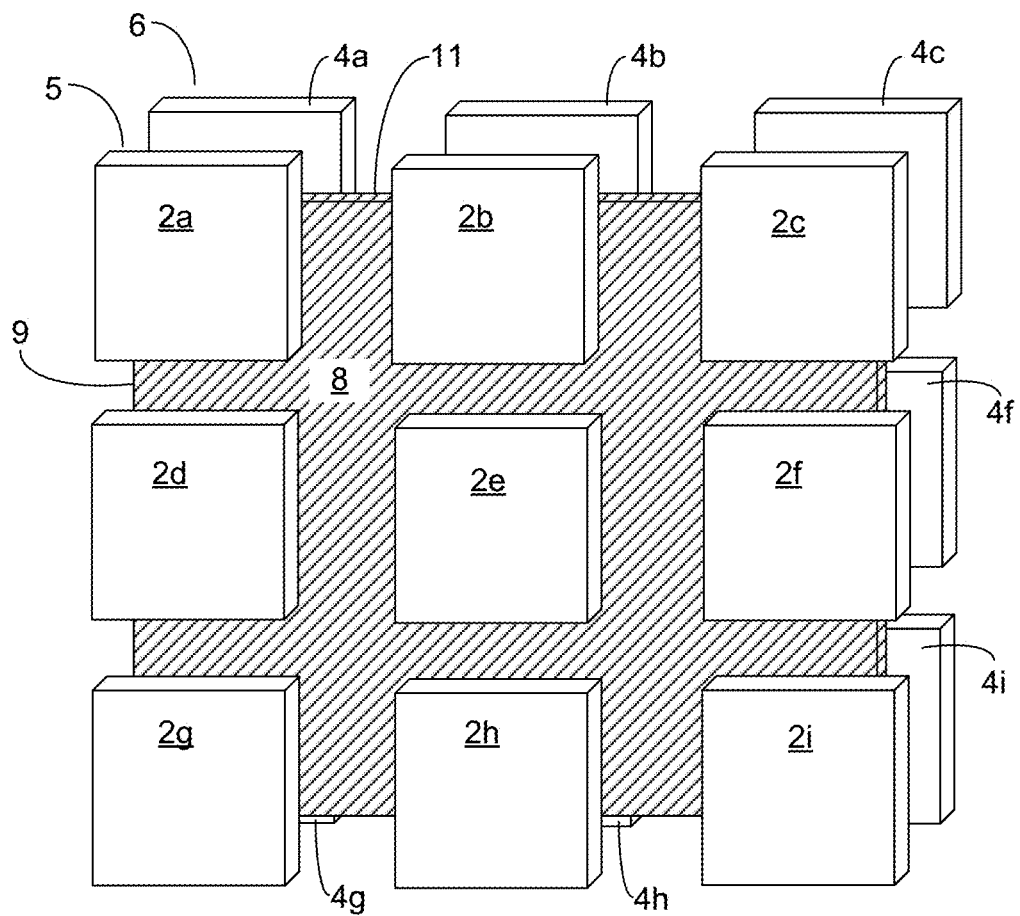
FIG. 4 illustrates an embodiment of a thermal energy storage medium between two pluralities of thermoelectric modules.
Figure 5:
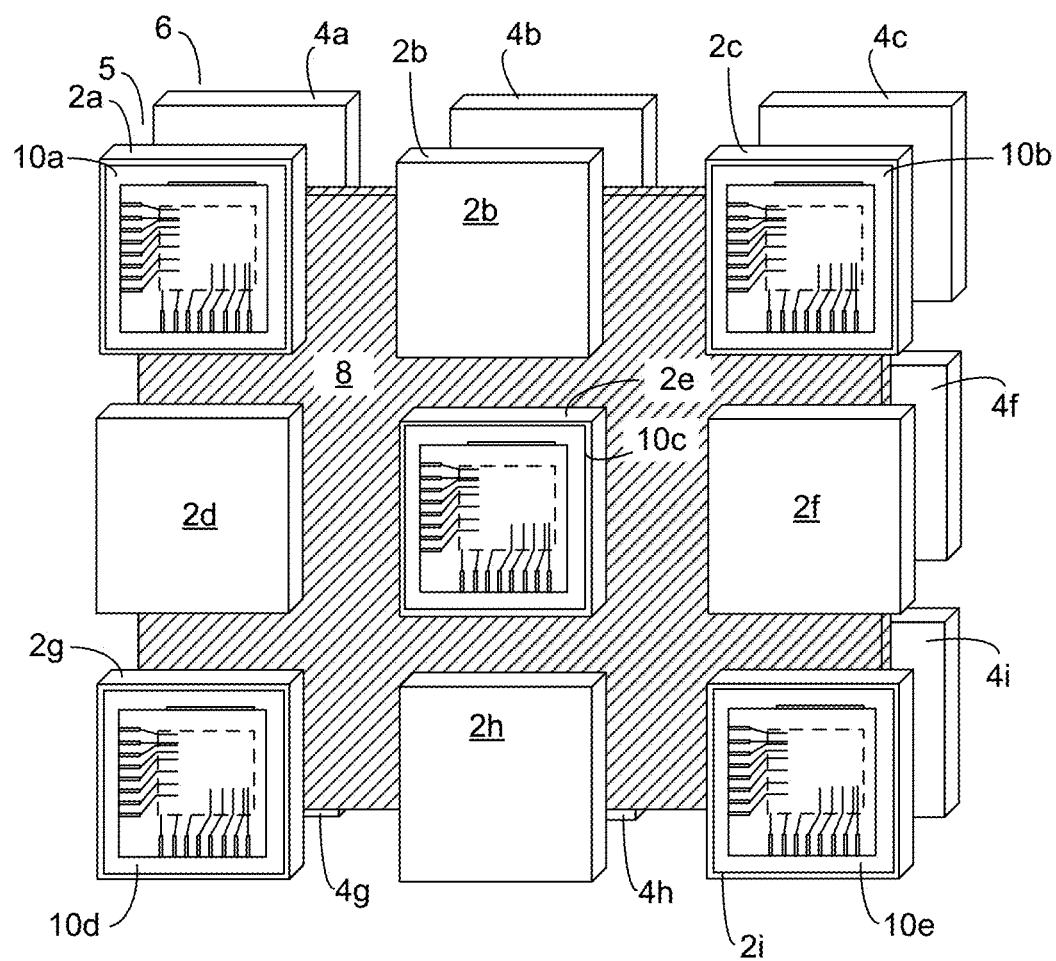
FIG. 5 illustrates an embodiment of one or more temperature sensors coupled to the thermoelectric modules.

As shown in FIGS. 4, 5 and 6, an embodiment of a system for managing heat energy may include a first thermoelectric module 2c, a phase change material 8, and a second thermoelectric module 4c. The first thermoelectric module 2c and the second thermoelectric module 4c may be used to transfer heat energy: into the phase change material 8 to increase the temperature of the phase change material, or from the phase change material 8 to decrease the temperature of the phase change material 8. Referring to FIG. 6, the described embodiment may be implemented as part of an enclosure that encompasses a volume 16 and at least partially isolates the volume 16 from an environment 18. The first thermoelectric module 2c may be positioned in the interior of the enclosure (i.e., thermally coupled to the interior 17 face of the phase change material 8), adjacent to the volume 16, and the second thermoelectric module 4c may be positioned on the exterior of the enclosure (i.e., thermally coupled to the exterior 19 face of the phase change material 8) and in contact adjacent to the environment 18. If it is desired to keep a temperature of volume 16 less than a temperature of the environment 18, a phase change material 8 with a solid-liquid transition temperature near the setpoint temperature of the volume 16 may be selected. As heat energy is absorbed into the phase change material 8 from the environment 18, it may be transferred out of the phase change material 8 by the second thermoelectric module 4c experiencing a temperature differential. The temperature differential may be between the second thermoelectric module's 4c first surface 70 thermally coupled to the phase change material 8 and its second surface 72 surface adjacent to the environment 18. Additionally, the temperature differential across the first thermoelectric module 2c, created by a first face 74 of the thermoelectric module 2c being thermally coupled to the phase change material 8 and a second face 76 being adjacent to the volume 16 of the enclosure, allows the first thermoelectric module to transfer heat energy from the phase change material 8. Managing the thermal energy of the phase change material 8 in this way allows the system to maintain a temperature of the phase change material 8 and maintain a temperature of the volume 16 air of the enclosure. The inverse of this may be performed by this embodiment, also. For example, when the desired temperature or setpoint temperature of the volume 16 of the enclosure was greater than the temperature of the environment 18, a phase change material 8 with a solid-liquid transition temperature near the desired temperature of the volume 16 may be selected. Maintaining a temperature of volume 16 greater than a temperature of environment 18 causes heat energy to be transferred into the phase change material 8 by the first thermoelectric module 2c and the second thermoelectric module 4c. Transferring heat energy into the phase change material 8, allows for radiative and/or convective heat transfer into the volume 16, maintaining the target or setpoint temperature of the volume 16.

A cross-sectional view of an embodiment is shown in FIG. 6, and the thermoelectric modules of the front-end array 5 and the back-end array 6 are shown as protruding from the phase change material. Some embodiments include thermoelectric modules from the front-end array 5 and back-end array 6 that are, at least partially, recessed within the phase change material. Further, various embodiments may also include one or more temperature sensors. For example, various embodiments may utilize: a temperature sensor 10b on the first thermoelectric module 2c (shown in FIG. 6), a temperature sensor on the second thermoelectric module 4c, a temperature sensor on an interior 17 side of the phase change material 8, a temperature sensor on an exterior 19 side of the phase change material 8, a temperature sensor within the phase change material 8 (i.e., between the interior 17 side of the phase change material and the exterior 19 side of the phase change material) or any combination thereof. A temperature sensor 10b on the first thermoelectric module 2c may be used for measuring the temperature of the volume 16, the temperature of the thermoelectric module, or both. A temperature sensor on the second thermoelectric 4c may be used to measure the temperature of the second thermoelectric module 4c, the temperature of the environment 18, or both. The environment 18 may include any wall layers on the exterior 19 side of the phase change material. A temperature sensor on the interior 17 side of the phase change material 8, may be used to measure the temperature of the phase change material 8, a temperature of volume 16, or both. A temperature sensor on the exterior 19 side of the phase change material 8 may be used to measure the temperature of the phase change material 8, a temperature of environment 16, or both. The temperature sensors 240 may be communicatively coupled to a thermostat or a processor 280, as shown in FIG. 1. Embodiments utilizing thermostats, may use the thermostat to adjust electrical energy outputs from the thermostat to the first thermoelectric module 2c, the second thermoelectric module 4c, or both. Electrical energy outputs from the thermostat to the first thermoelectric module 2c and/or the second thermoelectric module 4c may manage the heat energy within the phase change material 8, and thereby managing the thermal envelope, or heat transfer into and out of the enclosure. Similarly, embodiments utilizing processors 280 may receive one or more temperature measurements (e.g., from one or more temperature sensors 240) and adjust electrical energy outputs to the first thermoelectric module 2c, the second thermoelectric module 4c, or both. Electrical energy outputs from the processor 280 to the first thermoelectric module 2c and/or the second thermoelectric module 4c may manage the heat energy within the phase change material 8, and thereby managing the thermal envelope, or heat transfer into and out of the enclosure. Whether by thermostats or processors, some embodiments manage the heat energy of the phase change material 8 to achieve a desired temperature, a thermal comfort temperature, or a setpoint temperature in the volume 16.

Figure 2:
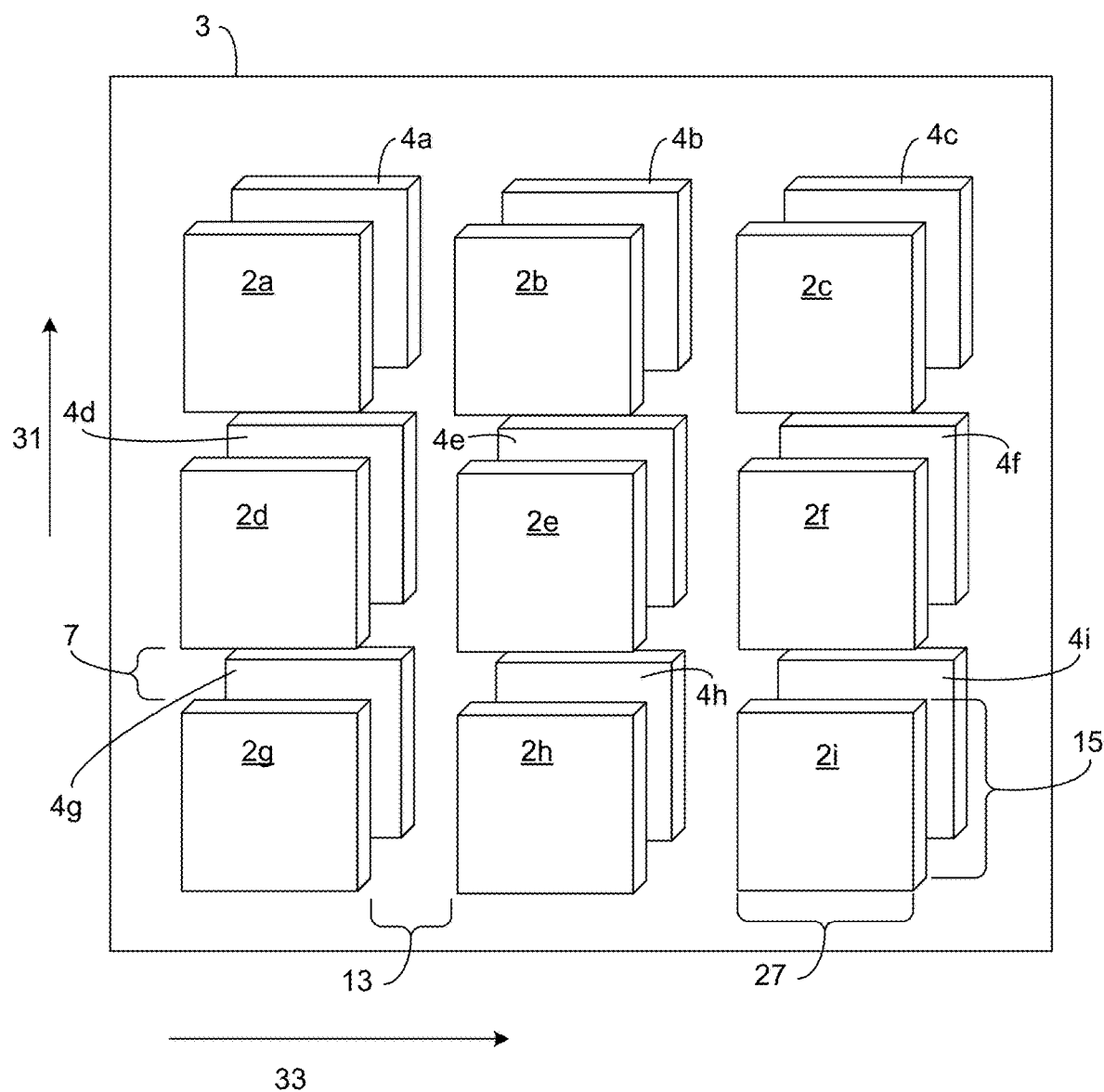
FIG. 2 illustrates an embodiment of two pluralities of thermoelectric modules.

As shown in FIG. 2, one embodiment of managing heat energy includes a first plurality of thermoelectric modules 2a, 2b, 2c, 2d, 2c, 2f, 2g, 2h, 2i, and a second plurality of thermoelectric modules 4a, 4b, 4c, 4d, 4c, 4f, 4g, 4h, 4i that function to manage heat energy. The schematic of FIG. 2 does not include a phase change material for better illustrating the second plurality of thermoelectric modules 4a, 4b, 4c, 4d, 4c, 4f, 4g, 4h, 4i. The first plurality of thermoelectric modules 2a, 2b, 2c, 2d, 2c, 2f, 2g, 2h, 2i define a front-end array 5, and the second plurality of thermoelectric modules 4a, 4b, 4c, 4d, 4c, 4f, 4g, 4h, 4i define a back-end array 6. Although nine modules are shown for each array, one of skill in the art will appreciate that any number of modules are contemplated herein. For example, one module, one module to 10 modules, one module to 100 modules, one module to 1,000 modules, etc. Further, although one array is shown in a front-end array and one array is shown in a back-end array, any number of arrays may be constructed from any number of modules.

FIG. 2 illustrates a plane 3 that divides the front-end array 5 and back-end array 6. The position of thermoelectric modules 2a, 2b, 2c, 2d, 2c, 2f, 2g, 2h, 2i of the front-end array 5, with respect to the plane 3, may be mirrored by thermoelectric modules 4a, 4b, 4c, 4d, 4c, 4f, 4g, 4h, 4i of the back-end array 6. The thermoelectric modules of the front-end array 5 may match the thermoelectric modules of the back-end array 6 positionally, mirrored about the plane 3, and may match in quantity. Alternatively, the thermoelectric modules 2a, 2b, 2c, 2d, 2c, 2f, 2g, 2h, 2i of the front-end array 5 may be offset from the thermoelectric modules 4a, 4b, 4c, 4d, 4c, 4f, 4g, 4h, 4i of the back-end array 6, with respect to the plane 3. Additionally, the quantity of thermoelectric modules of the front-end array 5 may not match the quantity of thermoelectric modules of the back-end array 6. The spacings 7, 13 between thermoelectric modules may vary between embodiments and applications. The spacings 7, 13 are largely dependent on the relative size and capability of the thermoelectric modules used, the volume of the enclosure considered, the thickness of the PCM material used, the atmospheric conditions of the enclosure, and the overall heat transfer capability of the embodiment. For example, if a modular thermoelectric module with a width 27 of about 4 cm and a length 15 of about 4 cm were used in the front-end array 5 and back-end array 6, the first spacing 7 between thermoelectric modules may be about 0 cm to about 400 cm; about 1 cm to about 100 cm; about 2 cm to about 50 cm; about 3 cm to about 20 cm; etc. Additionally, if a modular thermoelectric module with a width 27 of about 4 cm and a length 15 of about 4 cm were used in the front-end array 5 and back-end array 6, the second spacing 13 between thermoelectric modules may be about 0 cm to about 400 cm; about 1 cm to about 100 cm; about 2 cm to about 50 cm; about 3 cm to about 20 cm; etc. With respect to the plane 3 that divides the front-end array 5 and the back-end array 6, the thermoelectric modules of the front-end array 5 may be offset from the thermoelectric modules of the back-end array 6 along the vertical axis 31 by one half of the first spacing 7 or less. With respect to the plane 3 that divides the front-end array 5 and the back-end array 6, the thermoelectric modules of the front-end array 5 may be offset from the thermoelectric modules of the back-end array 6 along the horizontal axis 33 by one half of the second spacing 13 or less. In addition, some embodiments of the present invention may include a front-end array 5 with a single thermoelectric module and a back-end array 6 with a single thermoelectric module.

Figure 3A:
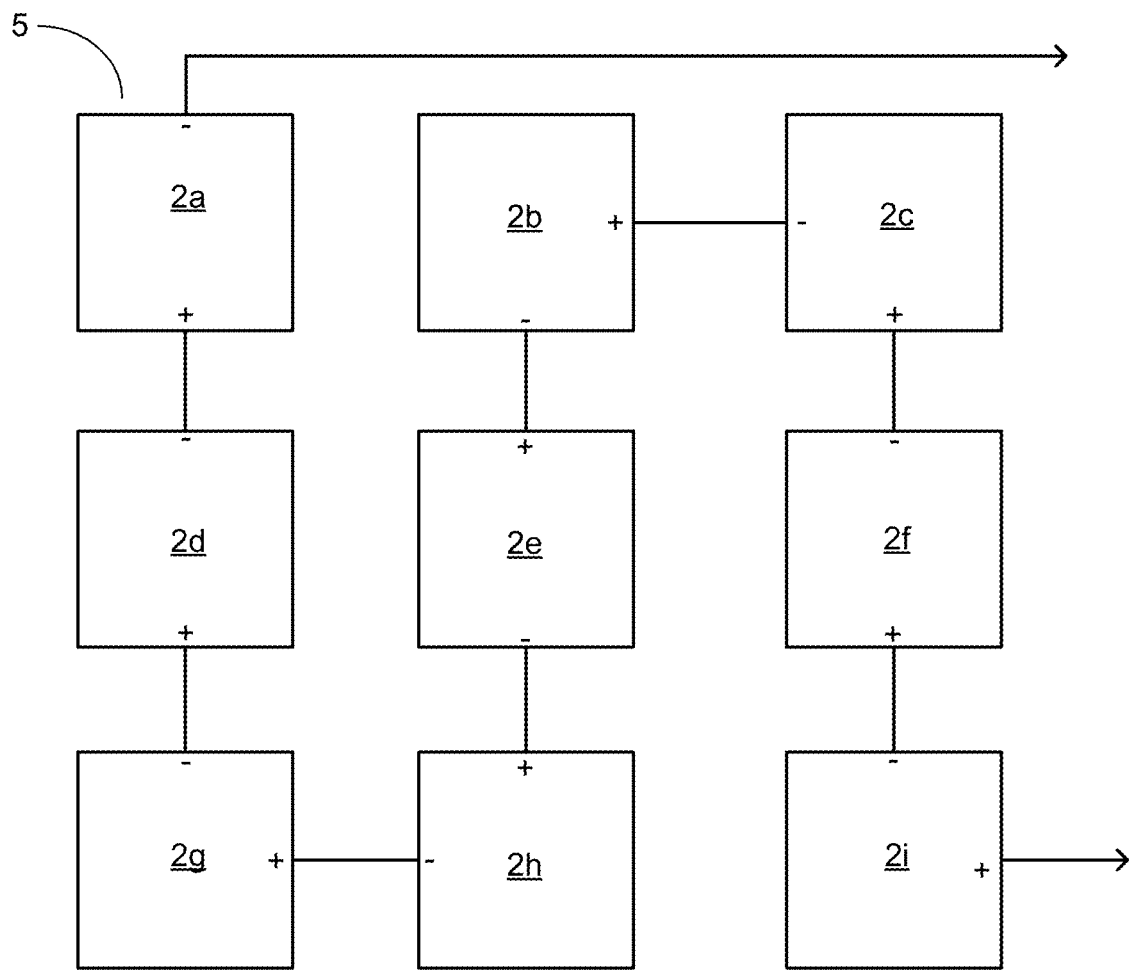
FIG. 3A illustrates an embodiment of in series wiring of thermoelectric modules.

FIG. 3A illustrates an embodiment of the front-end array 5 of the present invention. The front-end array 5 includes thermoelectric modules 2a, 2b, 2c, 2d, 2e, 2f, 2g, 2h, 2i for the managing of heat energy. The thermoelectric modules 2a, 2b, 2c, 2d, 2e, 2f, 2g, 2h, 2i are wired together in series (i.e., the positive side of one thermoelectric module wired to the negative side of another thermoelectric module). Although described for the thermoelectric modules 2a, 2b, 2c, 2d, 2e, 2f, 2g, 2h, 2i of the front-end array 5, the thermoelectric modules 4a, 4b, 4c, 4d, 4c, 4f, 4g, 4h, 4i of the back-end array 6 (shown in FIGS. 2, 4, 5, and 6) may be wired in series as well.

Figure 3B:
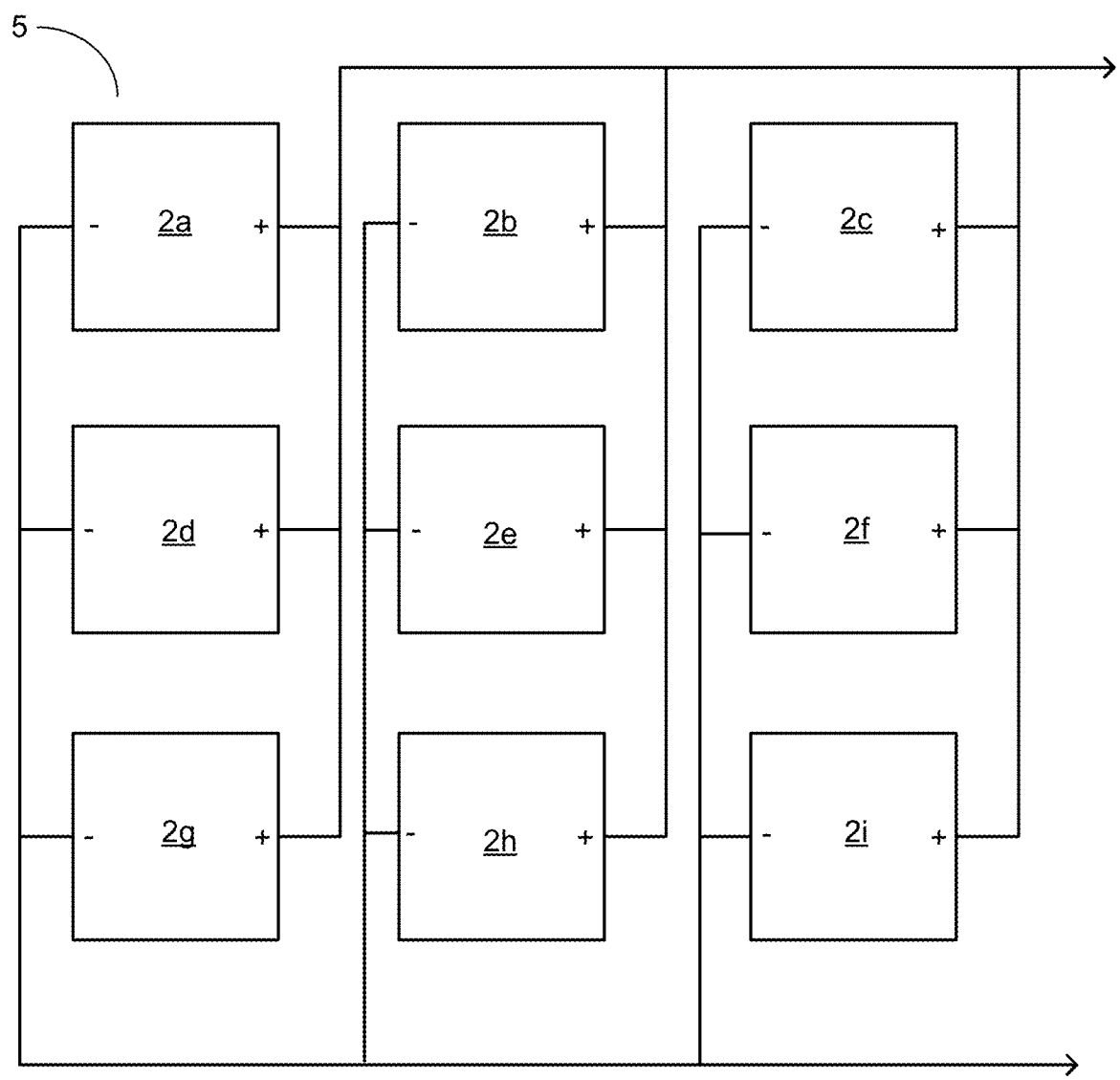
FIG. 3B illustrates an embodiment in parallel wiring of thermoelectric modules.

FIG. 3B illustrates an embodiment of the front-end array 5 of the present invention. The front-end array 5 includes thermoelectric modules 2a, 2b, 2c, 2d, 2e, 2f, 2g, 2h, 2i for the managing of heat energy. The thermoelectric modules 2a, 2b, 2c, 2d, 2c, 2f, 2g, 2h, 2i are wired together in parallel (i.e., the positive side of the thermoelectric modules wired together, and the negative side of the thermoelectric modules wired together). Although described for the thermoelectric modules 2a, 2b, 2c, 2d, 20, 2f, 2g, 2h, 2i of the front-end array 5, the thermoelectric modules 4a, 4b, 4c, 4d, 4c, 4f, 4g, 4h, 4i of the back-end array 6 (shown in FIGS. 2, 4, 5, and 6) may be wired in this same method as well.

FIG. 3A illustrates the front-end array 5 wired in series and FIG. 3B shows the front-end array 5 wired in parallel. Both the front-end array 5 and back-end array 6 (shown in FIGS. 2, 4, and 5) may be wired in either parallel or series, but it has been further contemplated that the thermoelectric modules of the front-end array 5 and the back-end array 6 may also be wired in series and parallel. Activation of the series wiring and parallel wiring grid may be independent. Said another way, electrical communication of the series grid or parallel grid can be made for desired effects on or from the thermoelectric modules wired in each grid. Redundant and/or alternative wiring for the thermoelectric modules of the front-end array 5 and the back-end array 6 may eliminate major disfunction of embodiments if a thermoelectric module fails or is damaged. For example, if an array of thermoelectric modules or a subset of thermoelectric modules in an array were only wired together in series, a damaged or failed thermoelectric module would render all thermoelectric modules in the array, or subset, useless. Said another way, a failed or damaged thermoelectric module in an array, or subset, wired only in series would break the continuity of the electrical circuit, thus, eliminating current flow to all thermoelectric modules.

FIG. 4 illustrates one embodiment of a system for managing heat energy. The embodiment includes a front-end array 5, a back-end array 6, and a phase change material 8. The phase change material 8 may be in a sheet form, as shown. The front-end array 5 includes thermoelectric modules 2a, 2b, 2c, 2d, 2c, 2f, 2g, 2h, 2i that may be wired together in series, parallel, both in series and parallel, or independently wired. Thermoelectric modules 2a, 2b, 2c, 2d, 2c, 2f, 2g, 2h, 2i are thermally coupled to the first face 9 (which may be an interior face) of the phase change material 8. The back-end array 6 includes thermoelectric modules 4a, 4b, 4c, 4d, 4c, 4f, 4g, 4h, 4i that may be wired together in series, parallel, both in series and parallel, or independently wired (thermoelectric modules 4d, 4c, 4g, 4h are not shown). Thermoelectric modules 4a, 4b, 4c, 4d, 4c, 4f, 4g, 4h, 4i are thermally coupled to the second face 11 (which may be an exterior face) of the phase change material 8. As described, the thermoelectric modules of the front-end array 5 can heat, cool, and/or harvest heat energy from the phase change material 8 from their interface on the first face 9 (or at least a portion of the phase change material 8 proximal to each thermoelectric module). The thermoelectric modules of the back-end array 6 can heat and/or cool the phase change material 8 from their interface on the second face 11 (or at least a portion of the phase change material proximal 8 to each thermoelectric module). Contemplated embodiments include controls which allow all or at least a subset of the thermoelectric modules of the front-end array 5 to be activated with the same current polarity. Activating all or at least a subset of the thermoelectric modules of the front-end array 5 with the same current polarity aligns the cold faces and hot faces. For example, all or at least a subset of the thermoelectric modules of the front-end array 5 may transfer heat energy into the phase change material 8, or all or at least a subset of the thermoelectric modules of the back-end array 6 may transfer heat energy from the phase change material 8. Contemplated embodiments including controls which allow all or at least a subset of the thermoelectric modules of the front-end array 5 to be activated with the same current polarity, may perform this function with the back-end array 6. For example, all or at least a subset of the thermoelectric modules of the front-end array 5 may transfer heat energy into the phase change material 8, or all or at least a subset of the thermoelectric modules of the back-end array 6 may transfer heat energy from the phase change material 8. Some embodiments may cycle heat energy back and forth across in at least a portion of the phase change material 8. Cycling heat energy across the phase change material 8 from the one or more thermoelectric modules of the front-end array 5 to the one or more counterpart thermoelectric modules of the back-end array 6, and back across to one or more thermoelectric modules of the front-end array 5 may preclude heat losses to the environment while improving the heating and cooling performance of the thermoelectric modules.

FIG. 5 shows an embodiment for managing heat energy including temperature sensors 10a, 10b, 10c, 10d, 10c, a front-end array 5, a back-end array 6, and a phase change material 8. The temperature sensors 10a, 10b, 10c, 10d, 10e may be coupled to the thermoelectric modules 2a, 2c, 2e, 2g, 2i, respectively. The temperature sensors 10a, 10b, 10c, 10d, 10e may be thermally coupled to the thermoelectric modules 2a, 2c, 2c, 2g, 2i, and may measure the temperature of the thermoelectric modules 2a, 2c, 2e, 2g, 2i. These measured temperatures of thermoelectric modules 2a, 2c, 2e, 2g, 2i may be received by one or more processors and used as feedback for control of electrical energy to the front-end array 5. Alternatively, or additionally, temperature sensors 10a, 10b, 10c, 10d, 10e may measure the air temperature proximal to each temperature sensor 10a, 10b, 10c, 10d, 10e. The temperature sensors 10a, 10b, 10c, 10d, 10e may include the capability of reading both the thermoelectric modules temperature and the air temperature. Temperature sensors may be positioned on one or more thermoelectric modules of the back-end array 6 and may perform similar functions as temperature sensors 10a, 10b, 10c, 10d, 10e. An exemplary, non-limiting embodiment of a temperature sensor 12c coupled to a thermoelectric module 4f of the back-end array is shown in FIG. 6.

Embodiments including a front-end array 5 and a back-end array 6 may function to manage a temperature of a volume 16, as shown in FIG. 6. These embodiments include an enclosure defining a volume 16 with at least a portion of the enclosure constructed of the phase change material 8 with a corresponding front-end array 5 and a corresponding back-end array 6. As such, heat energy may be removed from the phase change material 8 by the thermoelectric modules of the front-end array 5 and/or the back-end array 6. The process of removing heat energy from a properly selected phase change material 8 (e.g., one with an appropriate solid-liquid transition temperature for the intended purpose) may maintain a lower setpoint temperature of volume 16 relative to a temperature of the environment 18. Additionally, a setpoint temperature for the volume 16 greater than the temperature of the environment 18, may be maintained by transferring heat energy into a properly selected phase change material 8 (e.g., one with an appropriate solid-liquid transition temperature) from the front-end array 5 and the back-end array 6. The temperature measurements from temperature sensors 10a, 10b, 10c, 10d, 10e (e.g., as shown in FIG. 5) may be transmitted to one or more processors and/or received by one or more processors. The temperature measurements of the temperature sensors 10a, 10b, 10c, 10d, 10e may be indicative of the temperature of the respective thermoelectric modules 2a, 2c, 2e, 2g, 2i. When the temperature measurements are received by one or more processors, the temperature measurements may be used as feedback for control by one or more processors, such that the one or more processors output a signal to adjust the temperature of the respective thermoelectric module. Additionally, the temperature sensors 10a, 10b, 10c, 10d, 10e may be used to measure an air temperature in volume 16 proximal to each temperature sensor 10a, 10b, 10c, 10d, 10e. The air temperature measurements proximal to each temperature sensor 10a, 10b, 10c, 10d, 10c, when received by one or more processors, may be used as feedback for control by one or more processors, such that the one or more processors output a signal to adjust the temperature of the respective thermoelectric module. Temperature sensors, for example temperature sensor 12c, may be coupled to one or more thermoelectric modules of the back-end array 6, and may perform the same described capabilities as the temperature sensors 10a, 10b, 10c, 10d, 10e (i.e., measuring a temperature of one or more thermoelectric modules of back-end array 6, or measuring an air temperature of environment 18 proximal to the temperature sensors). Additionally, temperature sensors may be thermally coupled to, or at least partially recessed within, either the interior 17 side of the phase change material 8, the exterior 19 side of the phase change material 8, or both. Temperature sensors thermally coupled to the phase change material 8 may be used to measure the temperature of the phase change material 8, and when received by one or more processors, be used as control feedback. The measured temperatures of the phase change material 8 received by the one or more processors may cause the one or more processors to output a signal to adjust the electrical energy to a respective thermoelectric module.

Large-scale embodiments of the embodiments shown in FIGS. 4, 5, and 6 have been contemplated. Examples of large-scale embodiments may include embodiments forming enclosures, at least in part, such as, buildings, aircraft, vehicles, etc. For example, embodiments including a large number of thermoelectric modules in both the front-end array 5 and/or the back-end array 6, and coupled to an extensive sheet of phase change material 8. The thermoelectric module quantities for the front-end array and back-end array 6 may be within a range of about 1 to about 10, about 10 to about 100, about 100 to about 1000, about 1000 to about 10,000, about 10,000 to about 100,000, etc. In addition, embodiments including large amounts of thermoelectric modules may include a large quantity of temperature sensors coupled to the front-end array 5, as described for FIG. 5 for temperature sensors 10a, 10b, 10c, 10d, 10e. As shown in FIG. 5, the temperature sensors 10a, 10b, 10c, 10d, 10e are coupled to approximately 55% of the thermoelectric modules of the front-end array 5 in an evenly distributed pattern. Alternatively, or additionally, embodiments including temperature sensors coupled to the thermoelectric modules of the front-end array 5, may include temperature sensors coupled to the thermoelectric modules of the back-end array 6 in the same method as described for the front-end array 5 of FIG. 5. Temperature sensors may be coupled to thermoelectric modules in an evenly distributed pattern, or in unevenly distributed patterns. Some contemplated embodiments may include a temperature sensor to thermoelectric module ratio within a range of about 0% to about 10%, about 10% to about 20%, about 20% to about 30%, about 30% to about 40%, about 40% to about 50%, about 50% to about 60%, about 60% to about 70%, about 70% to about 80%, about 80% to about 90%, or about 90% to about 100%. Larger-scale embodiments may include a front-end array 5 and back-end array 6 with their respective thermoelectric modules wired individually; or in subsets wired in series, parallel, or both; or entirely in series, parallel, or both. When the respective thermoelectric modules of the front-end array 5 and/or back-end array 6 are wired individually or in subsets, independent control of heat energy within portions of the phase change material 8 may be performed by one or more processors. For example, at any one time, through the use of individually wired thermoelectric modules or wired subsets of thermoelectric modules of the front-end array 5 and/or the back-end array 6, heat energy may be added to a first portion of the phase change material 8, heat energy may be transferred from a second portion of the phase change material 8, heat energy may be harvested from a third portion of the phase change material, and/or heat energy may be neither added to or transferred from a fourth portion of the phase change material 8.

An example of a large-scale embodiment of the embodiment shown in FIGS. 4, 5, and 6 may include an enclosure with at least a portion of the barrier defining the enclosure being made of phase change material 8. Additionally, the phase change material 8 includes a corresponding front-end array 5, and a corresponding back-end array 6. The enclosure can isolate an internal volume 16 from an external environment 18 (e.g., as shown in FIG. 6). The front-end array 5 and back-end array 6 may include the capabilities of maintaining a temperature of volume 16 greater or less than a temperature of environment 18 by adding or removing heat energy from the phase change material 8 as a whole. Alternatively, embodiments with front-end array 5 and back-end array 6 thermoelectric modules wired individually, or in subsets, may include the capability of transferring heat energy from a first portion of the phase change material 8 to a second portion of the phase change material 8 with less heat energy. Further, embodiments with front-end array 5 and back-end array 6 thermoelectric modules wired individually, or in subsets, may include the capability of transferring electrical energy from an external circuit to a thermoelectric module, or a subset of thermoelectric modules, which converts the electrical energy into heat energy that is transferred into a portion of the phase change material 8. For example, a processor may receive an air temperature measurement for a portion of the volume 16 proximal to a temperature sensor on the front-end array 5 that is lower than the setpoint temperature of the volume 16. The processor can cause the transfer of electrical energy, harvested from heat energy from a first portion of the phase change material or drawn from an external circuit, to thermoelectric modules of the front-end array 5 and/or back-end array 6 proximal to the second portion of phase change material 8. Additionally, the processor can cause the transfer of electrical energy from an external circuit to thermoelectric modules of the front-end array 5 and/or back-end array 6 proximal to the second portion of phase change material 8. When the thermoelectric modules of the front-end array 5 and back-end array 6 proximal to the second portion of phase change material 8 receive the electrical energy, the thermoelectric modules transfer heat energy into the second portion of the phase change material.

As described above, at least a portion of the enclosure may be constructed with phase change material 8 and the corresponding front-end array 5 and back-end array 6, but, in some applications, it may be preferable to surround the inner volume 16 of the enclosure with large-scale implementation of the embodiments described herein. For example, an embodiment may be located on the interior 16 of the walls of an enclosure. Examples of enclosures that large-scale embodiments may be used in include containers (e.g., shipping containers), vehicles, watercraft, fuselages of aircraft, commercial and residential buildings, or any other enclosures in which the internal temperature is desired to be controlled and/or where heat energy is desired to be harvested and/or stored. These large-scale embodiments work especially well with enclosures that employ traditional HVAC systems for the control of internal temperatures.

Currently, there are many applications for traditional HVAC systems, including, buildings (both commercial and residential), vehicles, watercraft, fuselages of aircraft, and anywhere else human comfort level temperatures or temperature specifications are maintained. Traditional HVAC systems have several shortcomings that are addressed when coupled with large-scale embodiments of the various embodiments described herein. These shortcomings may include the extensive amount of heat energy that is lost through the wall or sides of the enclosures listed, static insulation faults, non-uniform thermal envelope, and, for enclosures with sub-enclosures (e.g., rooms within a building), lack of independent air temperature control within the sub-enclosures. The various embodiments described herein are capable of addressing, at least in part, all of these shortcomings. For example, and with reference to FIGS. 5 and 6, when any of the systems described herein are constructed or installed as the most interior portion of the walls, floor, windows, and/or roof of an enclosure with traditional HVAC, the systems described herein (e.g., any of the systems shown and/or described in FIGS. 1-6) could be used for individualized heating and/or cooling in the rooms of the enclosure, harvesting waste heat energy, transactive load control, monitoring of both the thermal envelope (and/or the hygrothermal performance) and structural performance of the building envelope, and supplying dynamic insulation capabilities to the enclosure. When heat energy is supplied to the air inside the enclosure (e.g., the volume 16 of FIG. 6) a portion of it is absorbed by the system (e.g., any of the systems shown and/or described in FIGS. 1-6) that is forming the most interior wall portion. With a properly selected phase change material 8 (i.e., a phase change material 8 with a solid-liquid transition temperature near the setpoint or target temperature for volume 16), e.g., as shown in FIG. 6, the phase change material 8 absorbs a large amount of heat energy with a relatively small amount of temperature gain. This inherent characteristic slows the loss of heat energy by introducing a smaller heat differential between the exterior 19 of the phase change material 8 and the proximal air influenced by, in this example, the colder environment 18, and it allows for a relatively large amount of heat energy to be harvested (by the thermoelectric modules) from the phase change material 8 without drastically affecting the temperature of the phase change material 8. The system (e.g., any of the systems shown and/or described in FIGS. 1-6) enables heat energy to be harvested from the phase change material 8 without drastically equilibrating the temperature of the phase change material 8 with the air temperature of volume 16.

Individualized heating and cooling in individual rooms may be accomplished in enclosures with or without traditional HVAC systems for the control of air within the enclosure but may have added performance improvements when coupled with an HVAC system. Referring to FIG. 6 and to volume 16 as the interior of the enclosure, traditional HVAC systems heat air by pumping warm air into the volume 16 (shown in FIG. 6) to raise or maintain the air temperature of volume 16. Traditional HVAC systems cool air by drawing in air from the volume 16 to remove heat energy and pump the now cooler air back into the volume 16 to lower or maintain the volume 16 air temperature. In many scenarios, enclosures utilize one HVAC system that is controlled by a central thermostat. As such, the HVAC system maintains the air temperature proximal to the thermostat, and based off the enclosure design and insulation envelope, the resulting temperatures within secondary rooms may vary considerably. If a large-scale embodiment of the present invention were implemented with the described enclosure, a much more uniform heating and cooling profile may be achieved throughout the enclosure. For example, if a secondary room is consistently warmer during the summer and cooler during the winter compared to the room the thermostat is located in, a large-scale system may transfer electrical energy to the front-end 5 and back-end 6 thermoelectric modules of the secondary room during the winter or harvest heat energy from the phase change material 8 within the secondary room during the summer. The electrical energy sent to the thermoelectric modules during the summer may be harvested from the phase change material 8 in areas of the enclosure other than the secondary room, for example, the primary room with the thermostat within it. By transferring heat energy from the phase change material 8 in the primary room, if the air temperature is lowered due to lowered phase change material temperature 8 proximal to the primary room air, this will be sensed by the thermostat, and the HVAC system will adjust for this imbalance. The inverse of this would be the secondary room being warmer than the primary room during the summer. The secondary room may be cooled by transferring heat energy from the phase change material within the secondary room. The harvested heat energy may then be used to actuate heat transfer into a portion of the phase change material 8 other than the portion within the secondary room, or may be transferred into an electrical energy storage device, for example, a battery for use later or sold back into an electrical grid. The heating and cooling of a secondary room may be done for a plurality of secondary rooms. The described heating and cooling of a secondary room or rooms may be used for moderating temperature throughout the enclosure according to a baseline calibration setpoint, or may be used for independent air temperature control of each secondary room.

Any of the large-scale embodiments described above, and as shown in FIG. 1 (e.g., where module 230 is a large-scale array) may be communicatively coupled to and controlled by one or more processors 280. The one or more processors 280 may be communicatively coupled to the temperature sensors 240 of the front-end array 5, back-end array 6, coupled to the phase change material, or a combination thereof. Additionally, the one or more processors 280 may be communicatively coupled to one or more devices for selecting desired temperatures for the respective one or more secondary rooms (e.g., an input device, computing device, remote, fob, etc., not shown). Based on the possible temperatures measured and, possibly on the temperature input settings, the one or more processors may cause the transfer of heat energy to accomplish the setpoint air temperatures while precluding heat losses to the enclosure envelope.

Traditional HVAC operating in an enclosure with static insulation perform to the best of its ability based on the design of the enclosure and insulation envelope implemented during the enclosure construction. As such, during heating operations, the envelope of the enclosure may suffer from areas of rapid heat transfer relative to areas of slow heat transfer. The imbalance in the enclosure envelope may result in inefficient and uneven heating within the enclosure. Any of the embodiments described herein, for example large-scale embodiments, may relieve at least a portion of this issue by harvesting heat energy from portions of phase change material 8 (shown in FIG. 6) proximal to the areas of slow heat transfer (as heat energy will most likely build-up here) in the enclosure envelope and transferring this heat energy to the portions of the phase change material 8 proximal to the areas of rapid heat transfer in the enclosure envelope. By transferring heat energy to the phase change material 8 proximal to the areas of rapid heat transfer, the thermal inertia of the phase change material 8 is increased near the area of rapid heat transfer, thus lowering the rate of heat transfer in those areas. The resulting thermal envelope of the enclosure would be more even, if thermally viewed from the exterior of the enclosure. The control of transferring heat energy between slow heat transfer areas and rapid heat transfer areas may be accomplished with one or more processors communicatively coupled to the temperature sensors described for the front-end array 5, back-end array 6, coupled to the phase change material, or a combination thereof. For example, a plurality of temperature sensors thermally coupled to the phase change material 8 may measure the temperature of the phase change material 8 to determine areas of heat energy build-up and areas of heat energy deficiencies. Based on these temperature measurements, the one or more processors may cause the transfer of heat energy in an effective manner.

Further contemplated embodiments may not include temperature sensors for the purpose of measuring a temperature of the phase change material 8 for indications of heat energy build-up or heat energy deficiencies. Alternative embodiments may include data-driven calibration capabilities, thus, eliminating the need for temperature measurements of the phase change material. The contemplated embodiments without temperature sensors for the phase change material may exploit data from historical data from the enclosure or a simulated thermal model of the enclosure. For example, a simulated thermal model (e.g., a finite element analysis) may generate control data of where rapid heat transfer and slow heat transfer may occur in the enclosure envelope, and, as such, the one or more processors may exploit this data to control from which portions of the phase change material 8 heat energy is harvested and into which portions of the phase change material 8 heat energy should be transferred into. Although described for the heating of an enclosure, the inverse of this during the summer may be accomplished as well (all seasonal variations have been contemplated). The example enclosure may suffer from the same rates of heat transfer in problem areas during the summer, but instead of areas losing heat energy too quickly, the areas may gain heat energy too quickly. The portions of the phase change material 8 proximal to these areas may then instead have heat energy harvested from them by the one or more thermoelectric modules. The heat energy harvested from the phase change material 8 proximal to these problem areas may be transferred to the thermoelectric modules of other areas of the phase change material 8 with lower heat energy, or to one or more electrical energy storage devices.

Although exemplified for enclosures utilizing HVAC systems, the benefits of large-scale embodiments may be used in vehicles, watercraft, aircraft, spacecraft, or any other enclosures in which the internal temperature is desired to be controlled and/or where heat energy is desired to be harvested and/or stored. Further, embodiments have been contemplated in which the front-end array and back-end array of thermoelectric modules and phase change material are the outermost layer with respect to the interior of the enclosure.

Figure 7:
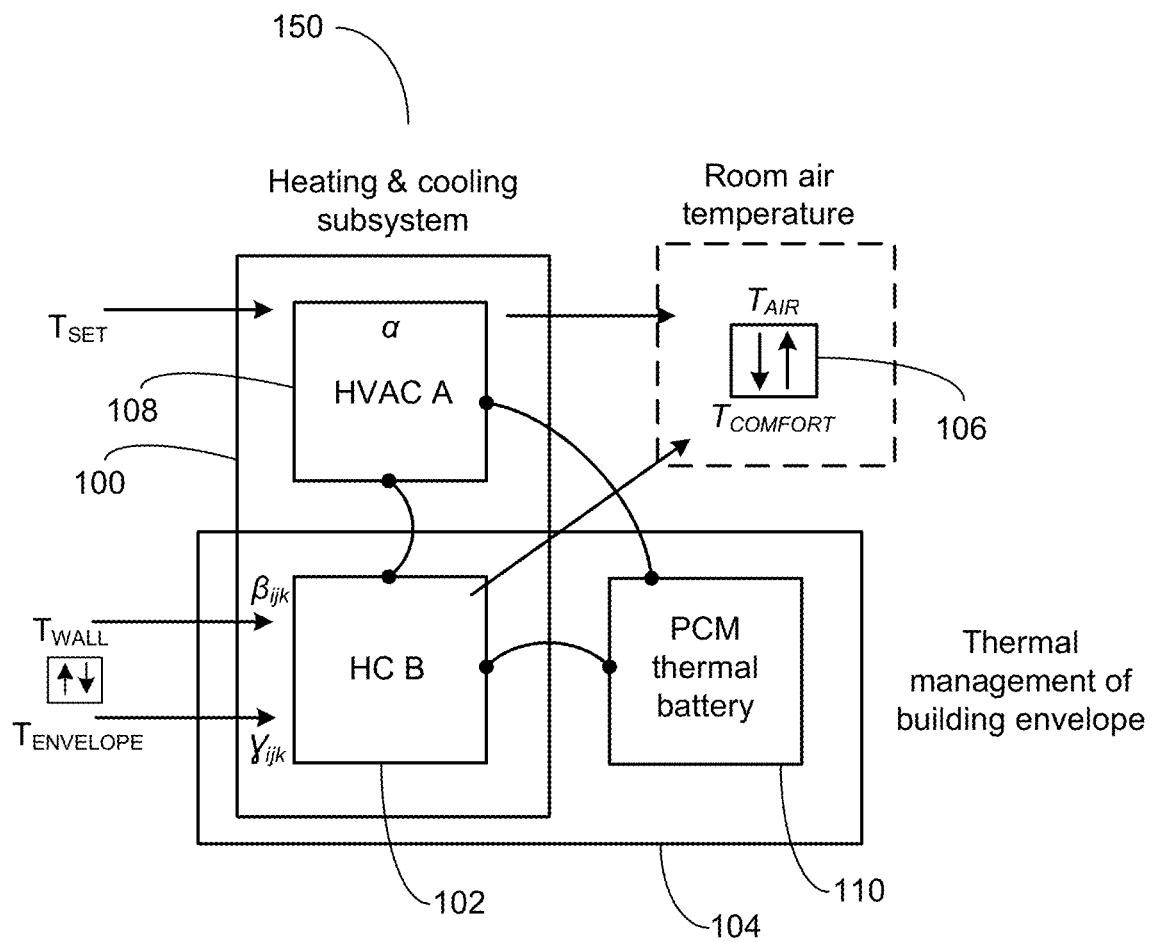
FIG. 7 illustrates an embodiment of a system for adjusting and maintaining temperatures within an enclosure.

FIG. 7 illustrates an embodiment of a system 150 for managing heat energy. The system includes heating, ventilation, and air conditioning system A 108 (HVAC A), heating and cooling system 102 (HC B), and a room temperature air input 106. The HVAC A 108 may be a traditional HVAC system. The HC B 102 may be any embodiments described herein (e.g., any of FIGS. 1-6) including a phase change material, a front-end array of thermoelectric modules and/or a back-end array of thermoelectric modules. The thermoelectric modules of the front-end array and back-end array may be thermally coupled to a phase change material 110, as shown and described above. The HC B 102 system coupled with the phase change material 110 may be responsible for thermal management of the enclosure envelope 104, as described herein. Wall temperatures measured or forecasted by the HC B 102 system may, at least in part, dictate what wall portions the HC B 102 system harvests heat energy from or transfers heat energy to. The HVAC A 108 system in coordination with the HC B 102 system form the heating and cooling subsystem 100 for the enclosure. The system 150 may function to measure, adjust, manage, and maintain the temperature of one or more volumes, rooms (i.e., compartments), etc. of the enclosure, collectively or independently. The setpoint temperature may be input at the room air temperature input 106. The processor may receive one or more air temperatures within a primary room and one or more wall temperatures within a primary room, output corresponding control signals to the HVAC A 108 and the HC B 102 system to adjust the air temperature of the primary room to the setpoint temperature or within a threshold range of the setpoint temperature. The HVAC A 108 may modulate air temperature based on a set desired air temperature set at the room air temperature input 106. The HC B 102 may manage heat energy within the phase change material 110 based on one or more setpoint temperatures, one or more wall temperatures, and one or more air temperatures. Some embodiments manage heat energy of portions of the phase change material 110 in secondary rooms (the primary room being where the thermostat of the HVAC A 108 system is located) to either moderate a temperature baseline or supply independent temperature control for the secondary rooms (i.e., compartments or volumes). The phase change material 110 may also be used as a thermal reservoir or a battery for thermal energy and may be used to store heat energy converted from electrical energy from external circuits. For example, when a solar array or wind turbine is electrically connected to the HC B 102 system, electrical energy may be transferred to the thermoelectric modules, converted to heat energy, and transferred into the phase change material 110 by the front-end array and back-end array. One or more processors may control where the thermal energy is stored based on wall temperature measurements, phase change material 110 temperature, or envelope temperature.

Figure 8:
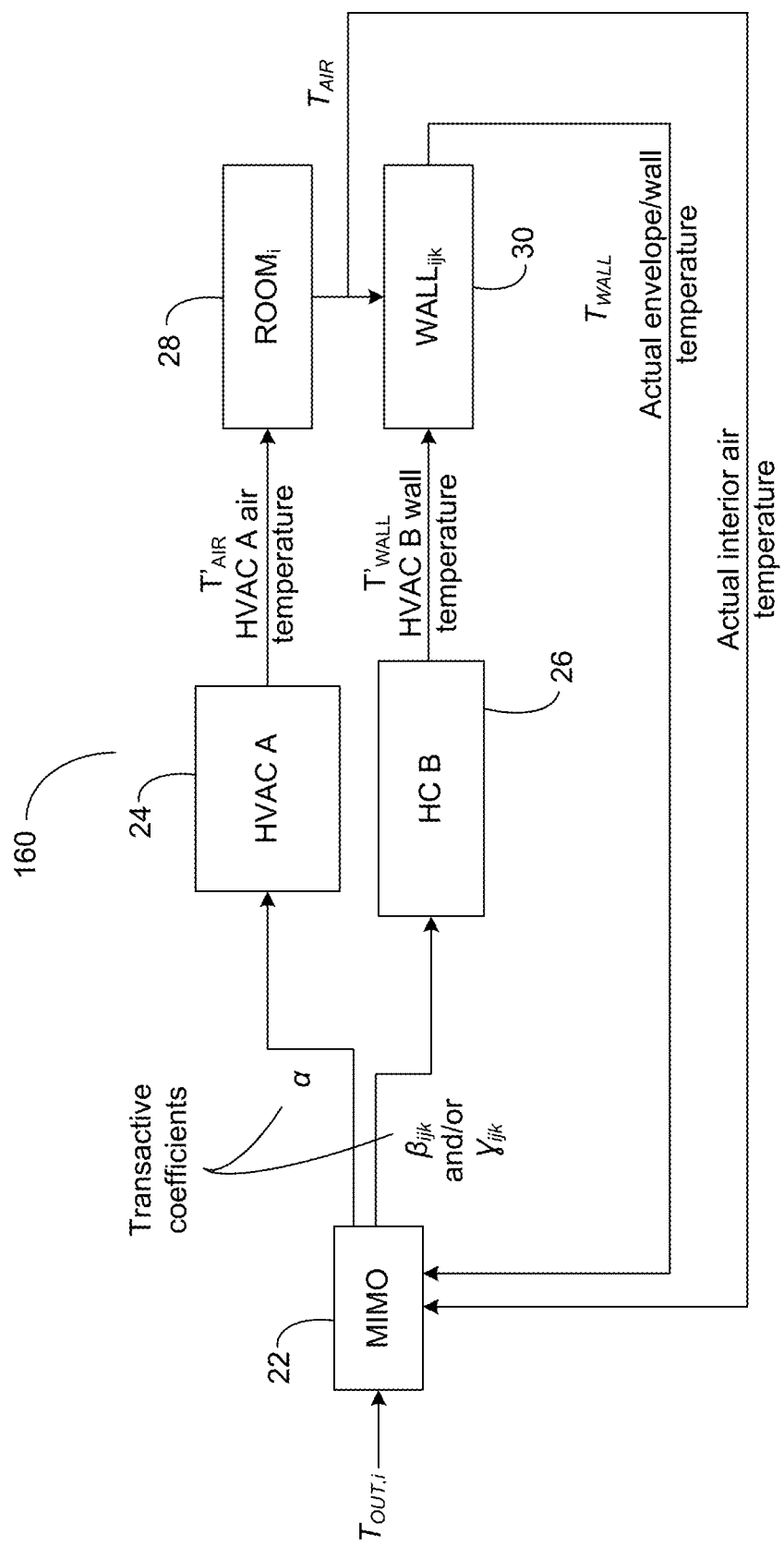
FIG. 8 illustrates an embodiment of a system for adjusting and maintaining temperatures within an enclosure.

FIG. 8 illustrates an embodiment of a system 160 for managing heat energy. The system includes a processor 22, a HVAC A 24 system, a HC B 26 system, one or more room temperatures 28, and one or more wall temperatures 30. The HC B 102 may be any embodiments described herein (e.g., any of FIGS. 1-7) including phase change material, a front-end array of thermoelectric modules, and/or a back-end array of thermoelectric modules. The processor 22 may be capable of receiving multiple inputs and outputting multiple outputs. Alternatively, the processor 22 may have data-driven calibration capabilities in which wall temperatures are forecasted, not measured. The system 160 functions to adjust or maintain a temperature 28 in one or more rooms or volumes or enclosures set at a human-machine interface communicatively coupled to the processor 22. The processor 22, which may be a network of processors, adjusts the output of the HVAC A 24 system and a HC B 26 system to adjust or maintain a primary room temperature 28. For example, heat energy may be transferred into or out of the phase change material in the primary room while the HVAC A 24 system inputs hot or cold air into the primary room. Air temperature within the primary room may be measured by one or more temperature sensors and provided or transmitted as feedback to the processor 22. One or more wall temperatures within the primary room may be measured by one or more temperature sensors or may be forecasted with data-driven calibration and provided or transmitted as feedback to the processor 22. Some embodiments include personalized heating and cooling within one or more secondary rooms (the primary room being where HVAC A 24 and HC B 26 work together to adjust or maintain the air temperature). In embodiments including personalized heating and cooling within one or more secondary rooms, the air temperature and wall temperature of the one or more secondary rooms may be measured by temperature sensors or may be forecasted with data-driven calibration and received by the processor 22. If the setpoint or desired air temperature of a secondary room is less than the actual air temperature, heat energy will be transferred out of the phase change material in the wall of the secondary room by the HC B 26 system, and the adjusted secondary room air temperature will be received by the processor 22 as feedback. If the desired air temperature of a secondary room is greater than the actual air temperature, heat energy will be transferred into the phase change material of the wall of the secondary room by the HC B 26 system, and the adjusted air temperature of the secondary room will be received by the processor 22 as feedback. The HC B 26 system may manage the heat energy in at least a portion of the phase change material based on one or more setpoint temperatures, one or more air temperatures, and/or one or more wall temperatures. The HC B 102 system may manage the heat energy in at least a portion of the phase change material for heating and cooling of an enclosure, and for the envelope thermal management of the enclosure.

A Coefficient of Performance, as known in the art, is the ratio of the amount of useful heating or cooling provided by a system (e.g., HVAC A 24 or HC B 102) to the work (e.g., Wattage) required to operate the system. The HC B 102 system described in FIGS. 7 and 8 may perform on-demand heating and cooling with a Coefficient of Performance (COP) greater than the COP of HVAC A 24. Further, the HC B 102 system may perform on-demand heating and cooling with all ranges of COP known in the art. Additionally, the HC B 102 system may perform on-demand heating and cooling over a temperature differential range in which the COP of the HC B 102 system is greater than the COP of the HVAC A 24 system. Further, the HC B 102 system may perform on-demand heating and cooling over a temperature differential range in which all ranges of COP are contemplated, irrespective of the COP of the HVAC A 24 system.

Embodiments described herein with independently wired or independently communicatively coupled thermoelectric modules or thermoelectric module subsets may include the capability of delivering heating and/or cooling patterns to different portions of the phase change material or the environment. As such, different waveforms and/or heating and cooling profiles may be introduced to portions of the phase change material or the environment.

Embodiments described herein may include microfluidic systems or heat exchanging pipe systems or channels within or near the phase change material. As such, microfluidic systems or heat exchanging pipe systems or channels may further facilitate heat transfer within portions of the phase change material by flowing liquid through phase change material portions with high heat energy levels to phase change material portions with lower levels of heat energy.

Embodiments described herein may include microfluidic systems or heat exchanging pipe systems or channels in place of phase change material. As such, microfluidic systems or heat exchanging pipe systems or channels may facilitate heat transfer from thermoelectric modules, as described herein for heat energy transferred and stored by phase change materials.

Any of the embodiments shown and/or described above, for example with respect to FIGS. 1-8 may also be referred to herein as a heating and cooling system, envelope thermal management system, or HC system, which is also shown below with the following methods (e.g., the methods of FIGS. 9-10).

METHODS

Figure 9:
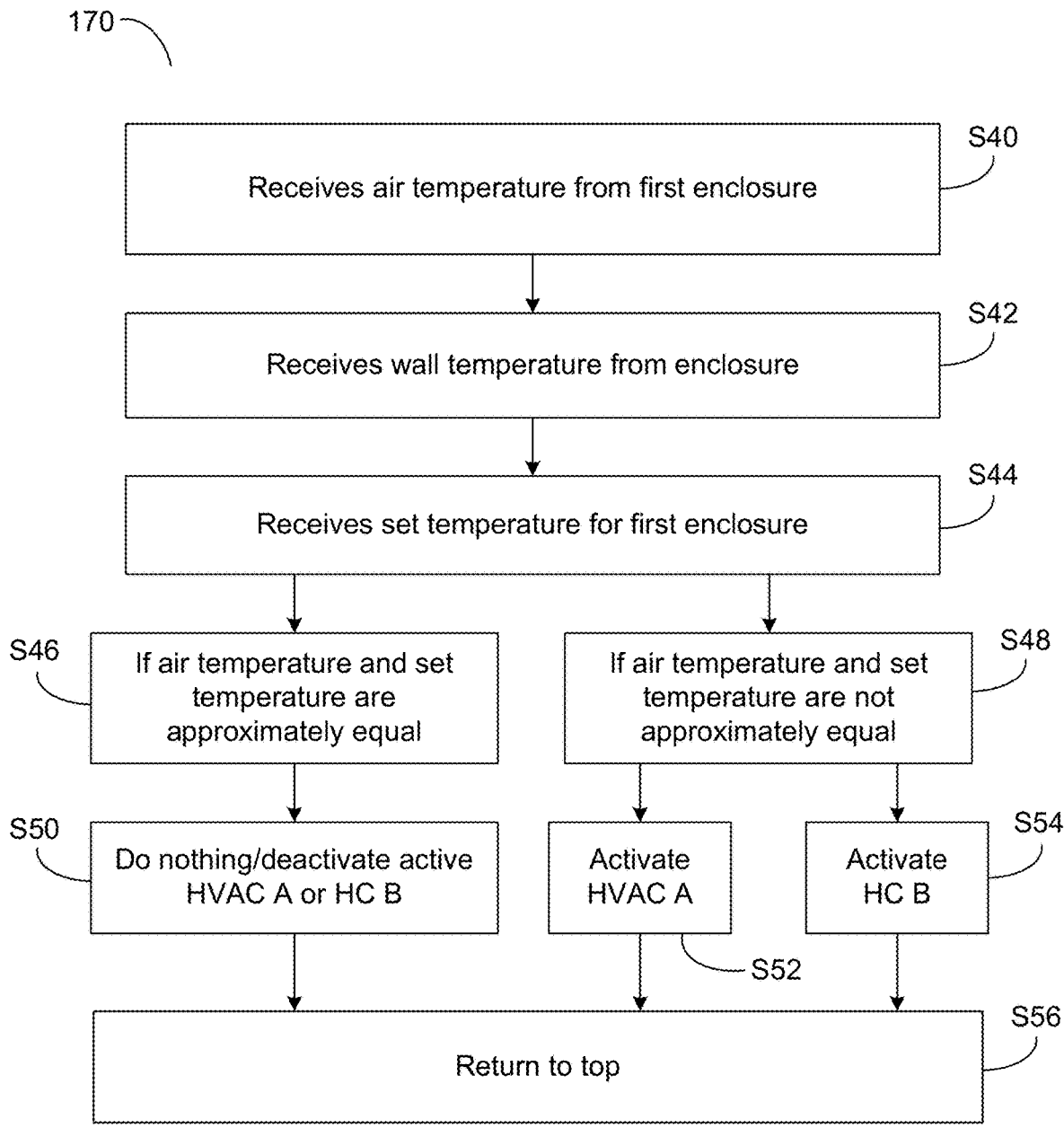
FIG. 9 illustrates an embodiment of a method for maintaining a temperature or temperatures within an enclosure.

As shown in FIG. 9, a method 170 for the managing of heat energy is shown. Method 170 may be a computer-implemented method. For example, the method 170 may be performed by one or more processors. The method 170 includes: receiving an air temperature from a first enclosure in block S40; receiving a wall temperature from a first enclosure in block S42; and receiving a setpoint temperature for the first enclosure in block S44. In a first process initiated at block S46, the method 170 includes: when the air temperature and set temperature are approximately equal, doing nothing (e.g., not outputting a control signal) or outputting a deactivation signal to deactivate an active heating, ventilation, and air conditioning (HVAC) system or active heating and cooling (HC) system at block S50; and at block S56 returning to the beginning of method 170. In a second process initiated at by block S48, the method 170 includes: when the air temperature and the set temperature are not approximately equal, outputting an activation signal to activate HVAC A at block S52, and/or outputting an activation signal to activate HC B; and at block S56 returning to the beginning of method 170. The method 170 functions to manage the temperature of an enclosure by operating a first HVAC system, which may be a traditional HVAC system, and a second HC (heating and cooling) system, which may be an embodiment of the present invention. The method is used for heating and cooling of enclosures, but can additionally or alternatively be used for any suitable applications, as described elsewhere herein. The method 170 can be configured and/or adapted to function for any suitable device or system that is designed for or would benefit from modulating temperature and/or managing heat energy.

As shown in FIG. 9, one embodiment of a method 170 for the managing of heat energy includes block S40, which recites receiving an air temperature from a first enclosure. Block S40 is a step of the system receiving an air temperature from a first enclosure. As described above for FIG. 7, the one or more processors may receive a measured temperature from a temperature sensor that measures an air temperature in the first enclosure.

As shown in FIG. 9, one embodiment of a method 170 for the managing of heat energy includes block S42, which recites receiving a wall temperature from the first enclosure. Block S42 is a step of the system receiving a wall temperature for a primary enclosure. As described above for FIG. 7, a wall temperature, as measured by a temperature sensor, is received by the one or more processors. Alternatively, the one or more processors may obtain the wall temperature from data-driven calibration.

As shown in FIG. 9, one embodiment of a method 170 for the managing of heat energy includes block S44, which recites receiving a setpoint air temperature for the first enclosure. Block S44 is a step of the system receiving a desired or setpoint air temperature setting for the first enclosure, for example, through the use of a human machine interface or based on model data. As described above for FIG. 7, a setpoint temperature is received at the enclosure air temperature input 106. The enclosure air temperature input 106 may be an analog thermostat or a thermostat with one or more processors. The air temperature input 106 may be configured to receive both the measured air temperature of the first enclosure and the setpoint temperature. Based on the measured air temperature of the first enclosure and the setpoint temperature, the system (e.g., any of the systems described in FIGS. 1-8) may execute one or more processes as shown in FIG. 9.

As shown in FIG. 9, the first process includes blocks S46 and S50 and recites: when the air temperature and setpoint temperature are approximately equal, outputting no control signal or outputting a deactivating signal to deactivate an active HVAC or HC B. If the enclosure temperature is approximately equal to the setpoint temperature, the system may shut-down an active HVAC A or HC B, or when an HVAC A and HC B is not active, do nothing. As described in FIG. 7, HVAC A 108 and HC B 102 modulate air temperature based on a setpoint temperature, if the actual air temperature is approximately equal to the setpoint temperature, HVAC A 108 and HC B 102 may likely be inactive.

As shown in FIG. 9, a second process includes blocks S48 and S54 and recites: when air temperature and setpoint temperature are not approximately equal, outputting an activation signal to activate the HVAC A and/or outputting an activation signal to activate HC B. As described in FIG. 7, HVAC A 108 may modulate air temperature based on the setpoint temperature and HC B 102 may manage heat energy within the phase change material based on the set air temperature. With HVAC A 108 modulating air temperature and HC B 102 managing heat energy within the phase change material (ultimately modulating the wall temperature), the air temperature within the enclosure may ultimately be adjusted to the setpoint temperature or within a threshold range of the setpoint temperature. At block S56, the first process and/or second process returns to block S40 of method 170 to adjust and/or maintain the air temperature at the setpoint temperature.

The method 170 of FIG. 9 may use one or more identifiers. For example, one or more identifiers generated by the one or more processors may create an index for portions of the walls within the enclosure or for an enclosure amongst a plurality of enclosures (e.g., in an apartment building). Further, one or more identifiers may be used to index each thermoelectric module. The use of these identifiers and resulting indexes allows the HC B 102 system to identify which portions of a particular wall needs an adjustment in temperature. Additionally, these identifiers may be used to identify which thermoelectric modules should be actuated to make the adjustment in temperature of the wall. In some embodiments, the actuation of HC B 102 and/or HVAC A 108 are controlled by two transactive coefficients, which weigh the relative importance of HVAC A 108 or a particular component of the HC B 102 system in heating or cooling, or thermal management of the enclosure envelope.

Figure 10:
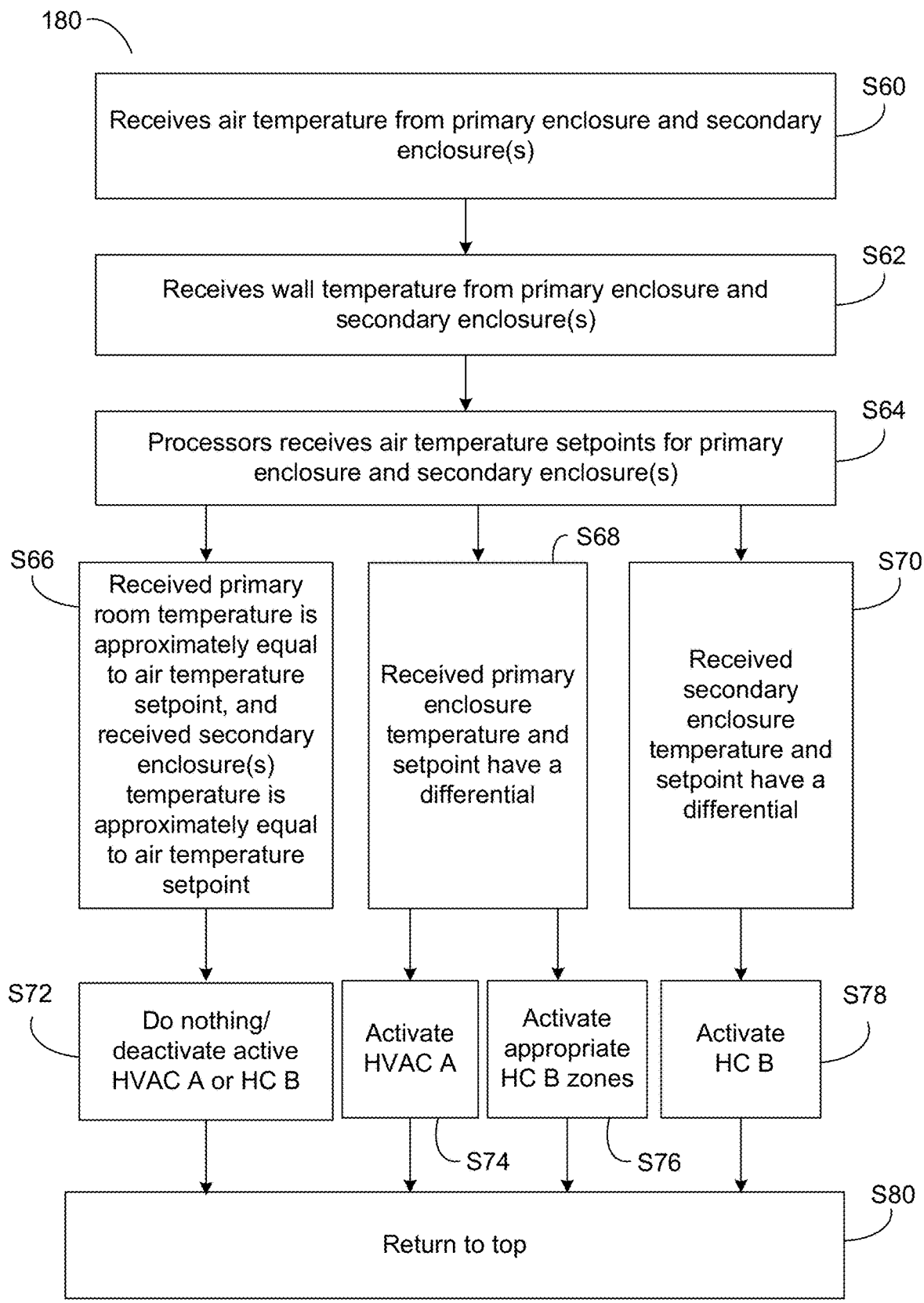
FIG. 10 illustrates an embodiment of a method for maintaining temperatures within two or more sub-enclosures of an enclosure.

As shown in FIG. 10, a method 180 for the managing of heat energy is shown. Method 180 may be a computer-implemented method. For example, the method 180 may be performed by one or more processors. The method 180 includes: receiving an air temperature from primary and secondary enclosure(s) in block S60; receiving a wall temperature from a primary enclosure and secondary enclosure in block S62; and receiving air temperature setpoints for the primary enclosure and secondary enclosure. At block S66, a first process is initiated that includes: receiving a primary enclosure temperature approximately equal to the setpoint air temperature, and receiving a secondary enclosure temperature approximately equal to the setpoint air temperature at block S66; and outputting no control signal or outputting a deactivation signal to deactivate an active HVAC A or HC B. The method 180 then repeats at block S80.

An alternative second process may be initiated at block S68, which recites: receiving a primary enclosure temperature and setpoint temperature with a differential between the temperatures; and outputting an activation signal to activate HVAC A at block S74 and/or outputting an activation signal to activate an appropriate HC B zone at block S76. The alternative second process proceeds to block S60 to repeat at least a portion of method 180.

An alternative third process may be initiated, which recites: receiving a secondary enclosure temperature and setpoint temperature with a differential between the temperatures at block S70; and outputting an activation signal to activate HC B at block S78. The alternative third process proceeds to block S60 to repeat at least a portion of method 180.

The method 180 functions to control the air temperature in a primary enclosure as well as in one or more secondary enclosures (i.e., compartments). In some embodiments, the method 180 functions to achieve a more equalized temperature baseline throughout the enclosure or a plurality of enclosures that are in thermal communication. In some embodiments, the method 180 functions to achieve independent temperature control for one or more secondary enclosure (i.e., compartments), with respect to the primary enclosure air temperature. The method 180 is used for the heating and cooling of enclosures, but can additionally or alternatively be used for any suitable applications, as described elsewhere herein. The method 180 can be configured and/or adapted to function for any suitable device or system that is designed for or would benefit from managing temperature and/or managing heat energy.

As shown in FIG. 10, one embodiment of a method 180 for managing heat energy includes block S60, which recites receiving an air temperature from a primary enclosure and secondary enclosure. Block S60 is a step of the system, via one or more processors, receiving an air temperature from a primary enclosure and one or more secondary enclosures. As described above for FIG. 8, a measured air temperature is received from the primary enclosure, and air temperature(s) are received from one or more secondary enclosures.

As shown in FIG. 10, one embodiment of a method 180 for managing heat energy includes block S62, which recites receiving a wall temperature from a primary enclosure and secondary enclosure(s). Block S62 is a step of the system, via one or more processors, receiving a wall temperature from a primary enclosure and one or more secondary enclosures. As described above for FIG. 8, a measured wall temperature is received from the primary enclosure, and air temperature(s) are received from one or more secondary enclosures. The wall temperatures of the primary enclosure and secondary enclosure(s) may be received by the one or more processors as measurements from temperature sensors or may achieved by data-driven calibration.

As shown in FIG. 10, one embodiment of a method 180 for managing heat energy includes block S64, which recites receiving air temperature setpoints for a primary enclosure and secondary enclosure(s). Block S62 is a step of the system, in which, via one or more processors, receiving a setpoint temperature for the primary enclosure and one or more secondary enclosures. As described above for FIG. 8, the processor 22 receives one or more setpoint temperatures for the primary enclosure (e.g., a central air temperature input) and the secondary enclosures. Some embodiments receive a setpoint temperature that represents a baseline temperature to be achieved throughout the enclosure or a plurality of enclosures in thermal communication (e.g., a building). Other contemplated embodiments receive a setpoint temperature for the primary enclosure and one or more independent setpoint temperatures for one or more respective secondary enclosures.

As shown for FIG. 10, a first process is initiated by block S66, which recites receiving a primary enclosure temperature approximately equal to air temperature setpoint, and receiving a secondary enclosure(s) temperature approximately equal to air temperature setpoint. As described for FIG. 8, the processor 22 receives temperature measurements for the primary enclosure and the one or more secondary enclosures. If the measured temperature of the primary enclosure and the one or more secondary enclosures approximately match (or are within a tolerance range) the setpoints for the respective enclosures, then the system should output no control signal or output a control signal deactivating the HVAC system and the HC B. Outputting no control signal or outputting a deactivation signal to deactivate an active HVAC A or HC B, is reflected by block S72, which recites doing nothing or deactivating HVAC and the HC B. The method 180 then repeats at block S80.

As shown for FIG. 10, a second procedure may be entered at block S68, which recites receiving a primary enclosure temperature and air temperature setpoint having a differential. As described for FIG. 8, the processor 22 receives temperature measurements for the primary enclosures that differ from the setpoint air temperature of the primary enclosure. If the measured temperature of the primary enclosure and the setpoint air temperature for the primary enclosure do not approximately match, then the system may output control signals activating the HVAC A 108 and the HC B 102 system to change the air temperature of the primary enclosure. Shown in FIG. 10, block S74 and block S76 reflect such. Block S74 recites activating HVAC A and block S76 recites activating appropriate HC B zones. The alternative second process proceeds to block S60 to repeat at least a portion of method 180.

As shown for FIG. 10, a third procedure may be entered at block S70, which recites receiving a secondary enclosure temperature and air temperature setpoint having a differential. As described for FIG. 8, the processor 22 receives temperature measurements for one or more secondary enclosures that differs from the setpoint air temperature of the one or more secondary enclosures. If the measured temperature of the one or more secondary enclosures and the setpoint air temperature for the one or more secondary enclosures do not approximately match, then the system may output control signals to activate the HC B 102 system to change the air temperature of the one or more secondary enclosures. Some embodiments output control signals to change the air temperature of the one or more secondary enclosures to match a baseline temperature for the enclosure. Other embodiments may output control signals to change the air temperature of the one or more secondary enclosures independently with the HC B 102 system to achieve independent temperature control in the one or more secondary enclosures. Block S78 (shown in FIG. 10) reflects this and recites activating HC B. The alternative third process proceeds to block S60 to repeat at least a portion of method 180.

The method 170 of FIG. 10 may use one or more identifiers. For example, one or more identifiers generated by the one or more processors may create an index for portions of the walls within the enclosure or for various enclosures amongst a plurality of enclosures (e.g., in a multi-room complex). Further, one or more identifiers may be used to index each thermoelectric module. Further, one or more identifiers may be used to index each room or area within the enclosure. The use of these identifiers and resulting indexes allows the HC B 102 system to identify which rooms or areas need an adjustment in temperature, which portions of the walls need an adjustment in temperature, and which thermoelectric modules should be actuated to make the adjustment in temperature of each wall portion. Additionally, these identifiers may be used to index each measured and/or data-driven calibration temperature, and each setpoint temperature. In some embodiments, the actuation of HC B 102 and/or HVAC A 108 are controlled by three or more transactive coefficients, which weigh the relative importance of HVAC A 108 or a particular component of the HC B 102 system in heating or cooling, or thermal management of the enclosure envelope.

A computer-implemented method may include receiving, at one or more processors, a predefined parameter for the enclosure. The predefined parameter received by the one or more processors may be determined from sensor data or a model of the enclosure or a similar enclosure (e.g., with one or more data-driven calibration processors). A computer-implemented method may further include receiving, at one or more processors, a predefined setpoint temperature input for the enclosure, and receiving, at one or more processors, a central air input for the enclosure. A computer-implemented method may include determining whether the central air input is within a tolerance range of the predefined setpoint temperature input. A computer-implemented method may include determining when the central air temperature input within a specific region is outside of the tolerance range of the predefined setpoint temperature input for that region. A computer implemented method may include modulating an air temperature of the enclosure using a temperature modulating system. In addition, a computer-implemented method may include determining a degree of modulation based on the predefined parameter for the enclosure. A computer implemented method may include actuating a first system to modulate the air temperature within the enclosure, and/or a second system to modulate a wall temperature of at least a portion of an interior wall of the enclosure to modulate the air temperature. The second system includes a first plurality of thermoelectric modules coupled to a first surface of a thermal energy storage medium and a second plurality of thermoelectric modules coupled to a second surface of the thermal energy storage medium. A computer-implemented method may obtain a predefined setpoint temperature input based on a predefined comfort specification. Further explained, methods may utilize data from simulated thermal models of enclosures or similar enclosures, collected sensor data, or enclosure energy use data, to determine a predefined parameter for control. The processor may use the data from the predefined parameter to determine where a system (e.g., any of the systems of FIGS. 1-8) will transfer heat energy to and from the phase change material.

Methods described herein may include the recognition of thermal bridging through an embodiment. The one or more processors described herein may read instructions from memory that identify when thermal bridging has occurred. For example, if a nail were to be driven through an embodiment, thermal bridging effects may occur due to the rapid influx of heat energy along the high thermal conductivity path formed by the nail. The one or more processors may recognize this occurrence by receiving changes in temperature measurements near the breached site. Once the thermal bridge is recognized, heat energy may be selectively moved into or out of the breached site, thereby managing the heat flow through the enclosure envelope at the breached site.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor of the thermostat, Building Automation System, server, IoT device, and/or computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

References in the specification to "one embodiment," "an embodiment," "an illustrative embodiment," "some embodiments," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used in the description and claims, the singular form "a", "an" and "the" include both singular and plural references unless the context clearly dictates otherwise. For example, the term "thermocouple" may include, and is contemplated to include, a plurality of thermocouples. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

Example 1. A system for managing heat energy, the system comprising: a thermal energy storage medium having a first surface opposite a second surface, a first thermocouple positioned on the first surface of the thermal energy storage medium; a first thermal interface material between the first thermocouple and the first surface of the thermal energy storage medium; a second thermocouple positioned on the second surface of the thermal energy storage medium; and a second thermal interface material between the second thermocouple and the second surface of the thermal energy storage medium.

Example 2. The system of any one of the preceding examples, particularly Example 1, wherein: the first thermocouple comprises more than one thermocouple such that the first thermocouple is a first thermoelectric module; and the second thermocouple comprises more than one thermocouple such that the second thermocouple is a second thermoelectric module.

Example 3. The system of any one of the preceding examples, particularly Example 1, further comprising one or more temperature sensors coupled to the first surface of the thermal energy storage medium.

Example 4. The system of any one of the preceding examples, particularly Example 1, further comprising one or more temperature sensors coupled to the second surface of the thermal energy storage medium.

Example 5. The system of any one of the preceding examples, particularly Example 1, wherein the first thermoelectric module is operating as a Peltier module.

Example 6. The system of any one of the preceding examples, particularly Example 1, wherein the second thermoelectric module is operating as a thermoelectric generator.

Example 7. The system of any one of the preceding examples, particularly Example 2, further comprising one or more temperature sensors coupled to the first thermoelectric module.

Example 8. The system of any one of the preceding examples, particularly Example 2, further comprising one or more temperature sensors coupled to the second thermoelectric module.

Example 9. The system of any one of the preceding examples, particularly Example 1, wherein the second thermoelectric module is operating as a Peltier module.

Example 10. The system of any one of the preceding examples, particularly Example 1, wherein the thermal energy storage medium comprises a phase change material.

Example 11. The system of any one of the preceding examples, particularly Example 10, wherein the phase change material comprises a hydrated salt, at least in part.

Example 12. The system of any one of the preceding examples, particularly Example 1, wherein the system is communicatively coupled with an external electrical circuit.

Example 13. The system of any one of the preceding examples, particularly Example 1, wherein the system is communicatively coupled with one or more electrochemical batteries.

Example 14. A system for managing heat energy, the system comprising: a thermal energy storage medium having a first surface opposite a second surface; a front-end array comprising a first plurality of thermoelectric modules, wherein the front-end array is positioned on the first surface of the thermal energy storage medium; and a back-end array comprising a second plurality of thermoelectric modules, wherein the back-end array is positioned on the second surface of the thermal energy storage medium.

Example 15. The system of any one of the preceding examples, particularly Example 14, further comprising a first thermal interface material between the front-end array and the first surface of the thermal energy storage medium.

Example 16. The system of any one of the preceding examples, particularly Example 14, further comprising a second thermal interface material between the back-end array and the second surface of the thermal energy storage medium.

Example 17. The system of any one of the preceding examples, particularly Example 14, wherein the first plurality of thermoelectric modules is configured as a film.

Example 18. The system of any one of the preceding examples, particularly Example 14, wherein the second plurality of thermoelectric modules is configured as a film.

Example 19. The system of any one of the preceding examples, particularly Example 14, wherein at least a subset of the first plurality of thermoelectric modules is wired in series to form the front-end array.

Example 20. The system of any one of the preceding examples, particularly Example 19, wherein at least the subset of the first plurality of thermoelectric modules is further wired in a combination of in series and in parallel.

Example 21. The system of any one of the preceding examples, particularly Example 14, wherein at least a subset of the second plurality of thermoelectric modules is wired in series to form the back-end array.

Example 22. The system of any one of the preceding examples, particularly Example 21, wherein at least the subset of the second plurality of thermoelectric modules is further wired in a combination of in series and in parallel.

Example 23. The system of any one of the preceding examples, particularly Example 14, wherein at least a subset of the first plurality of thermoelectric modules is wired in parallel to form the front-end array.

Example 24. The system of any one of the preceding examples, particularly Example 14, wherein at least a subset of the second plurality of thermoelectric modules is wired in parallel to form the back-end array.

Example 25. The system of any one of the preceding examples, particularly Example 14, further comprising one or more temperature sensors coupled to the first surface of the thermal energy storage medium.

Example 26. The system of any one of the preceding examples, particularly Example 14, further comprising one or more temperature sensors coupled to the second surface of the thermal energy storage medium.

Example 27. The system of any one of the preceding examples, particularly Example 14, further comprising one or more temperature sensors coupled to the first plurality of thermoelectric modules.

Example 28. The system of any one of the preceding examples, particularly Example 14, further comprising one or more temperature sensors coupled to the second plurality of thermoelectric modules.

Example 29. The system of any one of the preceding examples, particularly Example 14, wherein each of the first plurality of thermoelectric modules is operating as a Peltier module.

Example 30. The system of any one of the preceding examples, particularly Example 14, wherein each of the second plurality of thermoelectric modules is operating as a Peltier module.

Example 31. The system of any one of the preceding examples, particularly Example 14, wherein each of the first plurality of thermoelectric modules is operating as a thermoelectric generator.

Example 32. The system of any one of the preceding examples, particularly Example 14, wherein each of the second plurality of thermoelectric modules is operating as a thermoelectric generator.

Example 33. The system of any one of the preceding examples, particularly Example 14, wherein the thermal energy storage medium comprises a phase change material.

Example 34. The system of any one of the preceding examples, particularly Example 33, wherein the phase change material comprises a hydrated salt, at least in part.

Example 35. The system of any one of the preceding examples, particularly Example 14, wherein the system is in communicatively coupled with an external electrical circuit.

Example 36. The system of any one of the preceding examples, particularly Example 14, wherein the system is in electrical communication with one or more electrochemical batteries.

Example 37. A method of managing heat energy, the method comprising: coupling a front-end array on a first surface of a thermal energy storage medium, wherein the front-end array comprises one or more first thermoelectric modules; coupling a back-end array on a second surface of the thermal energy storage medium, wherein the first surface is opposite the second surface, and wherein the back-end array comprises one or more second thermoelectric modules; and modulating a temperature of at least a portion of the thermal energy storage medium using the front-end array, or the back-end array, or both.

Example 38. The method of any one of the preceding examples, particularly Example 37, further comprising positioning a first thermal interface material between the front-end array and the first surface of the thermal energy storage medium.

Example 39. The method of any one of the preceding examples, particularly Example 37, further comprising positioning a second thermal interface material between the back-end array and the second surface of the thermal energy storage medium.

Example 40. The method of any one of the preceding examples, particularly Example 37, further comprising electrically coupling one or more electrochemical batteries to the front-end array and the back-end array.

Example 41. The method of any one of the preceding examples, particularly Example 40, further comprising causing electrical energy generated from one or both of the front-end array or the back-end array to be transferred to the one or more electrochemical batteries.

Example 42. The method of any one of the preceding examples, particularly Example 40, further comprising causing electrical energy to be received by one or both of the front-end array or the back-end array from the one or more electrochemical batteries.

Example 43. The method of any one of the preceding examples, particularly Example 37, further comprising electrically coupling the front-end array and the back-end array to an external electrical circuit.

Example 44. The method of any one of the preceding examples, particularly Example 43, further comprising causing electrical energy generated from one or both of the front-end array or the back-end array to be transferred to the external electrical circuit.

Example 45. The method of any one of the preceding examples, particularly Example 43, further comprising causing electrical energy to be received by one or both of the front-end array or the back-end array from the external electrical circuit.

Example 46. The method of any one of the preceding examples, particularly Example 37, further comprising causing heat energy generated from one portion of the thermal energy storage medium to be transferred to another portion of the thermal energy storage medium.

Example 47. The method of any one of the preceding examples, particularly Example 46, wherein the thermal energy storage medium is configured to act as a reservoir or a battery for thermal energy.

Example 48. The method of any one of the preceding examples, particularly Example 47, further comprising causing electrical energy generated from one or both of the front-end array or the back-end array to be transferred to the thermal energy storage medium.

Example 49. The method of any one of the preceding examples, particularly Example 48, wherein the transfer is actuated over a range of temperatures at or near one or more phase transition temperatures of the thermal energy storage medium.

Example 50. The method of any one of the preceding examples, particularly Example 48, further comprising causing heat energy stored in a first portion of the thermal energy storage medium to be transferred to another portion of the thermal energy storage medium.

Example 51. The method of any one of the preceding examples, particularly Example 50, wherein the transfer is actuated when a phase transition temperature of the thermal energy storage medium is reached, or when the phase transition temperature of the thermal energy storage medium is within a predefined range.

Example 52. The method of any one of the preceding examples, particularly Example 46, further comprising causing heat energy to be harvested by one or both of the front-end array or the back-end array from the thermal energy storage medium.

Example 53. The method of any one of the preceding examples, particularly Example 52, wherein the transfer is actuated based on a range of phase transition temperatures of the thermal energy storage medium.

Example 54. A computer-implemented method of controlling a temperature within an enclosure, the method comprising: receiving a first air temperature input, at a processor, from a first one or more locations in the enclosure; receiving a first wall temperature input, at the processor, from the first one or more locations in the enclosure; receiving a first setpoint air temperature input, at the processor, for the first one or more locations in the enclosure; and when a first air temperature corresponding to the first air temperature input differs from the first setpoint air temperature input, outputting a first control signal to one or both of: a first system to modulate the first air temperature within the first one or more locations of the enclosure, or a second system to modulate a first wall temperature of at least a portion of an interior wall of the first one or more locations of the enclosure to modulate the first air temperature, wherein the second system comprises a first plurality of thermoelectric modules coupled to a first surface of a thermal energy storage medium and a second plurality of thermoelectric modules coupled to a second surface of the thermal energy storage medium, and wherein the second surface of the thermal energy storage medium is opposite the first surface of the thermal energy storage medium, the first surface defining an interior surface and the second surface defining an exterior surface.

Example 55. The computer-implemented of any one of the preceding examples, particularly Example 54, wherein the first system is one of: a heating, ventilation, and air conditioning system; a radiant heating system; a fan; or a radiant cooling system.

Example 56. The computer-implemented of any one of the preceding examples, particularly Example 54, receiving a second setpoint air temperature input, at the processor, for a second one or more locations in the enclosure.

Example 57. The computer-implemented of any one of the preceding examples, particularly Example 56, further comprising: receiving a second air temperature input, at the processor, from the second one or more locations in the enclosure; receiving a second wall temperature input, at the processor, from the second one or more locations in the enclosure; when a second air temperature corresponding to the second air temperature input differs from the second setpoint air temperature input, outputting a second control signal to the second system to modulate a second wall temperature of at least a portion of the interior wall of the second one or more locations of the enclosure to modulate the second air temperature.

Example 58. The computer-implemented of any one of the preceding examples, particularly Example 56, wherein outputting the first control signal to modulate the first air temperature of the first one or more locations is independent of outputting the second control signal to modulate the second air temperature of the second one or more locations, such that the first one or more locations is controlled independently of the second one or more locations.

Example 59. The computer-implemented of any one of the preceding examples, particularly Example 54, further comprising outputting one or more interior control signals to independently control each thermoelectric module of the first plurality of thermoelectric modules, thereby independently changing a heat energy storage medium temperature of the thermal energy storage medium proximal to each thermoelectric module of the first plurality of thermoelectric modules.

Example 60. The computer-implemented of any one of the preceding examples, particularly Example 54, further comprising outputting one or more exterior control signals to independently control each thermoelectric module of the second plurality of thermoelectric modules, thereby independently controlling a heat energy storage medium temperature of the thermal energy storage medium proximal to each thermoelectric module of the second plurality of thermoelectric modules.

Example 61. The computer-implemented of any one of the preceding examples, particularly Example 54, further comprising outputting two or more first interior control signals to independently control two or more first module subsets comprising two or more thermoelectric modules of the first plurality of thermoelectric modules communicatively coupled together in a circuit, thereby independently controlling a heat energy storage medium temperature of the thermal energy storage medium proximal to each of the two or more first module subsets.

Example 62. The computer-implemented of any one of the preceding examples, particularly Example 54, further comprising outputting two or more first exterior control signals to independently control two or more second module subsets comprising two or more thermoelectric modules of the second plurality of thermoelectric modules communicatively coupled together in a circuit, thereby independently controlling a heat energy storage medium temperature of the thermal energy storage medium proximal to each of the two or more second module subsets.

Example 63. The computer-implemented of any one of the preceding examples, particularly Example 54, wherein the second system is in communicatively coupled with one or more electrochemical batteries.

Example 64. The computer-implemented of any one of the preceding examples, particularly Example 54, wherein the second system is in communicatively coupled with an inverter configured to draw electrical energy from a direct current distributed energy resource.

Example 65. The computer-implemented of any one of the preceding examples, particularly Example 63, further comprising using the first plurality of thermoelectric modules to transfer at least a portion of electrical energy generated by the temperature differential between an air temperature on the interior surface of the thermal energy storage medium and a heat energy storage medium temperature of at least a portion of the thermal energy storage medium to the one or more electrochemical batteries, or to another portion of the thermal energy storage medium.

Example 66. The computer-implemented of any one of the preceding examples, particularly Example 63, further comprising using the second plurality of thermoelectric modules to transfer at least a portion of electrical energy generated by a temperature differential between at least a portion of the thermal energy storage medium and a temperature on the exterior surface of the thermal energy storage medium to the one or more electrochemical batteries, or to another portion of the thermal energy storage medium.

Example 67. The computer-implemented of any one of the preceding examples, particularly Example 54, wherein the second system is in communicatively coupled with an external electrical circuit.

Example 68. The computer-implemented of any one of the preceding examples, particularly Example 67, further comprising using the first plurality of thermoelectric modules to transfer at least a portion of electrical energy generated by the temperature differential between an air temperature on the interior surface of the thermal energy storage medium and a thermal energy storage medium temperature of at least a portion of the thermal energy storage medium to the external electrical circuit, or to another portion of the thermal energy storage medium.

Example 69. The computer-implemented of any one of the preceding examples, particularly Example 67, further comprising using the second plurality of thermoelectric modules to transfer at least a portion of electrical energy generated by a temperature differential between a portion of the thermal energy storage medium and an exterior temperature on the exterior surface of the thermal storage medium to the external electrical circuit, or to another portion of the thermal energy storage medium.

Example 70. The computer-implemented of any one of the preceding examples, particularly Example 54, further comprising outputting a signal to one or more speakers to cause the one or more speakers to generate an imitation sound of a heating, ventilation, and air conditioning system, when the second system is active and the first system is not active.

Example 71. A system of controlling an air temperature within an enclosure, the system comprising: a first system configured to modulate the air temperature within one or more compartments; a second system configured to modulate the temperature of at least a portion of an interior wall of the enclosure; and a processor communicatively coupled to the first and second systems, wherein the first system comprises a first plurality of thermoelectric modules coupled to a first surface of a thermal energy storage medium and the second system comprises a second plurality of thermoelectric modules coupled to a second surface of the thermal energy storage medium, the first surface, defining an interior surface, being opposite the second surface, defining an exterior surface.

Example 72. The system of any one of the preceding examples, particularly Example 71, wherein the first system is a heating, ventilation, and air conditioning system.

Example 73. The system of any one of the preceding examples, particularly Example 71, wherein the processor is configured to receive a setpoint air temperature input for the one or more compartments in the enclosure.

Example 74. The system of any one of the preceding examples, particularly Example 73, wherein the processor is configured to receive a plurality of setpoint air temperatures, each corresponding to a room air temperature.

Example 75. The system of any one of the preceding examples, particularly Example 74, wherein the processor is configured to modulate a temperature of at least a portion of the interior wall of each room with an indicated desired setpoint air temperature independently of one another.

Example 76. The system of any one of the preceding examples, particularly Example 71, wherein the processor is configured to independently control each thermoelectric module of the first plurality of thermoelectric modules, thereby independently changing a thermal energy storage medium temperature of the thermal energy storage medium proximal to each thermoelectric module.

Example 77. The system of any one of the preceding examples, particularly Example 71, wherein the processor is configured to independently control each thermoelectric module of the second plurality of thermoelectric modules, thereby independently changing a thermal energy storage medium temperature of the thermal energy storage medium proximal to each thermoelectric module.

Example 78. The system of any one of the preceding examples, particularly Example 71, wherein the processor is configured to independently control two or more first module subsets comprising two or more thermoelectric modules of the first plurality of thermoelectric modules communicatively coupled together in a circuit, thereby independently changing a thermal energy storage medium temperature of the thermal energy storage medium proximal to each of the first plurality of thermoelectric modules.

Example 79. The system of any one of the preceding examples, particularly Example 71, wherein the processor is configured to independently control two or more second module subsets comprising two or more thermoelectric modules of the second plurality of thermoelectric modules communicatively coupled together in a circuit, thereby independently changing the temperature of the thermal energy storage medium proximal to each of the second plurality of thermoelectric modules.

Example 80. The system of any one of the preceding examples, particularly Example 71, wherein the second system is in communicatively coupled with one or more electrochemical batteries.

Example 81. The system of any one of the preceding examples, particularly Example 80, wherein the second system, using the first plurality of thermoelectric modules, is configured to transfer at least a portion of electrical energy generated by the temperature differential between an air temperature on an interior side of the thermal energy storage medium and a thermal energy storage medium temperature of at least a portion of the thermal energy storage medium to the one or more electrochemical batteries, or to another portion of the thermal energy storage medium.

Example 82. The system of any one of the preceding examples, particularly Example 80, wherein the second system, using the second plurality of thermoelectric modules, is configured to transfer at least a portion of electrical energy generated by the temperature differential between at least a portion of the thermal energy storage medium and a temperature on an exterior side of the thermal energy storage medium to the one or more electrochemical batteries, or to another portion of the thermal energy storage medium.

Example 83. The system of any one of the preceding examples, particularly Example 71, wherein the second system is in communicatively coupled with an external electrical circuit.

Example 84. The system of any one of the preceding examples, particularly Example 83, wherein the second system, using the first plurality of thermoelectric modules, is configured to transfer at least a portion of electrical energy generated by the temperature differential between a temperature on an interior side of the thermal energy storage medium and a thermal energy storage medium temperature of at least a portion of the thermal energy storage medium to the external electrical circuit, or to another portion of the thermal energy storage medium.

Example 85. The system of any one of the preceding examples, particularly Example 83, wherein the second system, using the second plurality of thermoelectric modules, is configured to transfer at least a portion of electrical energy generated by the temperature differential between at least a portion of the thermal energy storage medium and a temperature on an exterior side of the thermal energy storage medium to the external electrical circuit, or to another portion of the thermal energy storage medium.

Example 86. The system of any one of the preceding examples, particularly Example 71, further comprising one or more speakers configured to generate an imitation sound of a heating, ventilation, and air conditioning system when the second system is active and the first system is not active.

Example 87. The system of any one of the preceding examples, particularly Example 71, wherein communicatively coupled comprises wirelessly coupled.

Example 88. The system of any one of the preceding examples, particularly Example 71, wherein communicatively coupled comprises a wired connection.

Example 89. A computer-implemented method of controlling a temperature within an enclosure, the method comprising: receiving, at a processor, a predefined parameter for the enclosure, wherein the predefined parameter is determined from sensor data or a model of the enclosure or a similar enclosure; receiving, at the processor, a predefined setpoint temperature input for the enclosure; receiving a central air temperature input, at the processor, for the enclosure; determining whether the central air temperature input is within a tolerance range of the predefined setpoint temperature input; when the central air temperature input within a specific region is outside of the tolerance range of the predefined setpoint temperature input for that region, modulating an air temperature of the enclosure using a temperature modulating system, wherein a degree of modulation is based on the predefined parameter for the enclosure.

Example 90. The computer-implemented method of any one of the preceding examples, particularly Example 89, wherein the temperature modulating system comprises one or both of: a first system to modulate the air temperature within the enclosure, or a second system to modulate a wall temperature of at least a portion of an interior wall of the enclosure to modulate the air temperature, wherein the second system comprises a first plurality of thermoelectric modules coupled to a first surface of a thermal energy storage medium and a second plurality of thermoelectric modules coupled to a second surface of the thermal energy storage medium, and wherein the second surface of the thermal energy storage medium is opposite the first surface of the thermal energy storage medium, the first surface defining an interior surface and the second surface defining an exterior surface.

Example 91. The computer-implemented method of any one of the preceding examples, particularly Example 89, wherein the predefined setpoint temperature input is based on a predefined comfort specification.

What is claimed is:

1. A method of managing heat energy, the method comprising:
   coupling a front-end array on a first surface of a thermal energy storage medium configured to act as a reservoir or a battery for thermal energy, wherein the front-end array comprises one or more first thermoelectric modules configured to generate heat energy from the thermal energy storage medium and transfer the heat energy to the thermal energy storage medium, wherein the first surface defines an interior surface;
   coupling a back-end array on a second surface, opposite the first surface, of the thermal energy storage medium, wherein the back-end array comprises one or more second thermoelectric modules configured to generate heat energy from the thermal energy storage medium and transfer heat energy to the thermal energy storage medium, wherein the second surface defines an exterior surface;
   causing heat energy generated from one portion of the thermal energy storage medium to be transferred to another portion of the thermal energy storage medium or surrounding environment, when a setpoint temperature of the thermal energy storage medium is near or at a phase transition temperature, and the phase transition temperature of the thermal energy storage medium is within a predefined temperature range of the setpoint temperature; and
   modulating a temperature of at least a portion of the thermal energy storage medium using the front-end array, or the back-end array, or both.

2. The method of claim 1, further comprising positioning a first thermal interface material between the front-end array and the first surface of the thermal energy storage medium.

3. The method of claim 1, further comprising positioning a second thermal interface material between the back-end array and the second surface of the thermal energy storage medium.

4. The method of claim 1, further comprising electrically coupling one or more electrochemical batteries to the front-end array and the back-end array.

5. The method of claim 4, further comprising causing electrical energy generated from one or both of the front-end array or the back-end array to be transferred to the one or more electrochemical batteries.

6. The method of claim 4, further comprising causing electrical energy to be received by one or both of the front-end array or the back-end array from the one or more electrochemical batteries.

7. The method of claim 1, further comprising electrically coupling the front-end array and the back-end array to an external electrical circuit.

8. The method of claim 7, further comprising causing electrical energy generated from one or both of the front-end array or the back-end array to be transferred to the external electrical circuit.

9. The method of claim 7, further comprising causing electrical energy to be received by one or both of the front-end array or the back-end array from the external electrical circuit.

10. The method of claim 1, wherein the transfer is actuated over a range of temperatures at or near one or more phase transition temperatures of the thermal energy storage medium.

11. The method of claim 1, further comprising causing heat energy stored in a first portion of the thermal energy storage medium to be transferred to another portion of the thermal energy storage medium.

12. The method of claim 1, further comprising causing heat energy to be harvested by one or both of the front-end array or the back-end array from the thermal energy storage medium.

13. A method of managing heat energy, the method comprising:
coupling a front-end array on a first surface of a thermal energy storage medium configured to act as a reservoir or a battery for thermal energy, wherein the front-end array comprises one or more first thermoelectric modules configured to generate heat energy from the thermal energy storage medium and transfer the heat energy to the thermal energy storage medium, wherein the first surface defines an interior surface;
coupling a back-end array on a second surface, opposite the first surface, of the thermal energy storage medium, wherein the back-end array comprises one or more second thermoelectric modules configured to generate heat energy from the thermal energy storage medium and transfer heat energy to the thermal energy storage medium, wherein the second surface defines an exterior surface;
causing heat energy generated from one portion of the thermal energy storage medium to be transferred to another portion of the thermal energy storage medium or surrounding environment, wherein the thermal energy storage medium includes a phase change material, and the transfer is actuated when a setpoint temperature of the thermal energy storage medium is near or at a phase transition temperature, and the phase transition temperature of the phase change material is within a predefined temperature range of the setpoint temperature; and
modulating a temperature of at least a portion of the thermal energy storage medium using the front-end array, or the back-end array, or both.

14. The method of claim 13, wherein the transfer is actuated over a range of temperatures at or near one or more phase transition temperatures of the thermal energy storage medium.

15. The method of claim 13, further comprising causing heat energy stored in a first portion of the thermal energy storage medium to be transferred to another portion of the thermal energy storage medium.

16. The method of claim 15, wherein the transfer is actuated when a phase transition temperature of the thermal energy storage medium is reached.

17. The method of claim 13, further comprising causing heat energy to be harvested by one or both of the front-end array or the back-end array from the thermal energy storage medium.

18. A method of managing heat energy, the method comprising:
coupling a front-end array on a first surface of a thermal energy storage medium configured to act as a reservoir or a battery for thermal energy, wherein the front-end array comprises one or more first thermoelectric modules configured to generate heat energy from the thermal energy storage medium and transfer the heat energy to the thermal energy storage medium, wherein the first surface defines an interior surface of at least one wall;
coupling a back-end array on a second surface, opposite the first surface, of the thermal energy storage medium, wherein the back-end array comprises one or more second thermoelectric modules configured to generate heat energy from the thermal energy storage medium and transfer heat energy to the thermal energy storage medium, wherein the second surface defines an exterior surface of the at least one wall;
causing heat energy generated from one portion of the thermal energy storage medium to be transferred to another portion of the thermal energy storage medium, wherein the thermal energy storage medium includes a phase change material; and
modulating a temperature of at least a portion of the thermal energy storage medium to thermally regulate both sides of the at least one wall of an enclosure using the front-end array, or the back-end array, or both.

19. The method of claim 18, wherein the transfer is actuated over a range of temperatures at or near one or more phase transition temperatures of the thermal energy storage medium.

20. The method of claim 18, wherein the at least one wall includes one of: an interior wall or barrier defining the enclosure.

* * * * *